US012750264B2

(12) United States Patent
Chen et al.

(10) Patent No.: US 12,750,264 B2
(45) Date of Patent: Sep. 29, 2026

(54) DATA TRANSMISSION METHOD AND COMMUNICATION APPARATUS

(71) Applicant: HUAWEI TECHNOLOGIES CO., LTD., Shenzhen (CN)

(72) Inventors: Jun Chen, Chengdu (CN); Zhihu Luo, Beijing (CN); Zhenwei Lu, Shenzhen (CN); Yujian Tang, Chengdu (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 180 days.

(21) Appl. No.: 18/758,115

(22) Filed: Jun. 28, 2024

(65) Prior Publication Data

US 2024/0356791 A1 Oct. 24, 2024

Related U.S. Application Data

(63) Continuation of application No. PCT/CN2022/139099, filed on Dec. 14, 2022.

(30) Foreign Application Priority Data

Dec. 30, 2021 (CN) ......................... 202111655063.7

(51) Int. Cl.
*H04L 27/26* (2006.01)

(52) U.S. Cl.
CPC ...... *H04L 27/2602* (2013.01); *H04L 27/2626* (2013.01)

(58) Field of Classification Search
CPC ... H04L 27/2602; H04L 27/2626; H04L 1/08; H04L 1/0003; H04L 1/0041; H04L 69/22;
(Continued)

(56) References Cited

U.S. PATENT DOCUMENTS 6,985,510 B2 * 1/2006 Willenegger .......... H04B 1/707 370/522
7,535,860 B2 * 5/2009 Park ...................... H04L 5/0048 370/204

(Continued)

FOREIGN PATENT DOCUMENTS

CA 2381827 C * 10/2008 ............ H03M 13/47
CN 108288970 A 7/2018

(Continued)

OTHER PUBLICATIONS

Machine translation of CN-104412554-A (Year: 2015).*
Machine translation of CN-112583520-A (Year: 2021).*
ISO 18000-6C, "EPC™ Radio-Frequency Identity Protocols Class-1 Generation-2 UHF RFID Protocol for Communications at 860 MHz—960 MHz Version 1.2.0", Specification for RFID Air Interface, EPCglobal Inc., Oct. 23, 2008, 108 pages.

(Continued)

*Primary Examiner* — Jean B Corrielus
(74) *Attorney, Agent, or Firm* — Maier & Maier, PLLC

(57) ABSTRACT

A data transmission method and a communication apparatus. A first device may determine a second sequence, where the second sequence is obtained based on a base sequence and a first mask, and the first mask corresponds to a first encoding scheme. The first device sends the second sequence and a first sequence, where the first sequence includes a first encoded bit sequence obtained by encoding an information bit sequence based on the first encoding scheme, the first encoded bit sequence includes N bits, and N is a positive integer. The second device receives the second sequence and the first sequence from the first device and processes the received first encoded bit sequence by using a decoding scheme corresponding to the first encoding scheme. This manner is applicable to long-distance data transmission and may reduce missed detection and false detection of the first encoded bit sequence.

18 Claims, 11 Drawing Sheets

(58) Field of Classification Search
CPC ..... H04L 69/16; H04J 13/0074; H04J 13/107; H04W 24/02
See application file for complete search history.

(56) References Cited

U.S. PATENT DOCUMENTS

| | | | | |
|---|---|---|---|---|
| 2008/0298488 | A1* | 12/2008 | Shen | H04W 72/20 375/260 |
| 2016/0134394 | A1* | 5/2016 | Tiruvur | H04L 27/06 398/45 |
| 2017/0019216 | A1* | 1/2017 | Li | H04L 1/08 |
| 2019/0273576 | A1* | 9/2019 | Zhang | H04L 1/0057 |
| 2022/0321389 | A1* | 10/2022 | Taherzadeh Boroujeni | H04L 25/0224 |

FOREIGN PATENT DOCUMENTS

| | | | |
|---|---|---|---|
| EP | 2220907 | B1 | 12/2017 |
| WO | 2017031643 | A1 | 3/2017 |
| WO | 2018203931 | A1 | 11/2018 |

OTHER PUBLICATIONS

ISO/IEC 18000-63, "Information Technology—Radio Frequency Identification for Item Management—Part 63: Parameters for Air Interface Communications at 860 MHz to 960 MHz Type C", International Standard, ISO/IEC, Jan. 15, 2013, 308 pages.

* cited by examiner

DATA TRANSMISSION METHOD AND COMMUNICATION APPARATUS

CROSS-REFERENCE TO RELATED APPLICATIONS

This application is a continuation of International Application No. PCT/CN2022/139099, filed on Dec. 14, 2022, which claims priority to Chinese Patent Application No. 202111655063.7, filed on Dec. 30, 2021. The disclosures of the aforementioned applications are hereby incorporated by reference in their entireties.

TECHNICAL FIELD

Embodiments relate to the field of communication technologies and to a data transmission method and a communication apparatus.

BACKGROUND

Rapid development of Internet of things (IoT) technologies has made the Internet of everything gradually become a reality. However, a battery life of an Internet of things terminal is short. This increases maintenance difficulties and costs of the terminal and becomes a major bottleneck restricting the development of the Internet of things. Backscatter communication based on wireless power transmission, envelope detection demodulation, and reflection scattering modulation technologies is expected to resolve terminal lifespan and maintenance problems, making a next-generation passive Internet of things of ultra-low-cost, high-density, and maintenance-free terminals become possible.

A widely used ultra-high frequency (UHF) radio frequency identification (RFID) system is one of the backscatter communication systems. A typical passive UHF RFID system architecture is shown in FIG. 1. A reader provides energy for a tag by sending a downlink excitation signal to the tag. The tag receives signaling sent by the reader, and sends an uplink signal to the reader based on a backscatter technology.

In the conventional technology, short-distance transmission between the reader and the tag can be considered. Therefore, an application scenario is limited, and only a local area scenario is applicable. In a wide area scenario, there are both short-distance transmission and long-distance transmission between the reader and the tag. Therefore, the two transmission cases need to be considered.

A similar scenario also exists in another technology such as wake-up radio (WUR). For example, a similar problem also exists when a transmit end device sends wake-up data to a receive end device.

SUMMARY

The embodiments provide a data transmission method and a communication apparatus to support long-distance data transmission.

The data transmission method provided in the embodiments may be applied to a backscatter communication system or a WUR application scenario. This is not limited. The method may be performed by a first device, or may be performed by a second device, or may be implemented by interaction between the first device and the second device. The first device may be a network device, a transmission reception point (TRP), a 5th generation (5G) base station (gNB), a reader, or the like. The second device may be a terminal device, a vehicle-mounted device, a tag, or the like. This is not limited. Description is provided by way of the interaction between the first device and the second device.

According to a first aspect, the embodiments provide a data transmission method. A first device determines a second sequence, where the second sequence is obtained based on a base sequence and a first mask, and the first mask corresponds to a first encoding scheme. The first device sends the second sequence and a first sequence, where the first sequence includes a first encoded bit sequence obtained by encoding an information bit sequence based on the first encoding scheme, the first encoded bit sequence includes N bits, and N is a positive integer. A second device may receive the second sequence and the first sequence from the first device. The second device determines the first encoding scheme corresponding to the first mask based on the second sequence. The second device processes the received first encoded bit sequence by using a decoding scheme corresponding to the first encoding scheme.

It can be seen that the second device in the embodiments may process the received first encoded bit sequence based on a decoding scheme corresponding to an encoding scheme corresponding to the first mask, to obtain to-be-received information. In addition, the second sequence is determined by using the base sequence and the first mask. Both the first device and the second device know the base sequence. When determining the second sequence, the second device may first perform correlation based on the base sequence, and then perform correlation based on the first mask. In other words, the second device may perform hierarchical correlation, so that correlation complexity of the second device can be reduced.

In the embodiments, the second device determines a start location of the first encoded bit sequence by using the received second sequence. For example, when detecting the second sequence, the second device may use a moment corresponding to an end of the second sequence as the start location of the first encoded bit sequence, so that the second device can accurately determine a location of a $1^{st}$ first encoded bit sequence, preventing the second device from missed detection and false detection of the first encoded bit sequence as much as possible.

In an optional manner, the first mask corresponds to a coverage level of the second device.

It should be noted that the coverage level may be alternatively replaced with a coverage condition, a type of the second device, a capability of the second device, signal power, signal quality, a quantity of repetitions, a data rate, or the like. This is not limited.

The first mask in the embodiments corresponds to the coverage level of the second device. A poor channel condition such as long-distance transmission corresponds to a high coverage level. In this case, the first mask corresponds to a low-code-rate encoding scheme. A good channel condition such as short-distance transmission corresponds to a low coverage level. In this case, the first mask corresponds to a high-code-rate encoding scheme. In the embodiments, the first encoded bit sequence is obtained based on the first encoding scheme corresponding to the first mask. In this way, for long-distance transmission, a transmit end may obtain the first encoded bit sequence by using a low-code-rate encoding scheme, and the second device may also decode the received first encoded bit sequence by using a decoding scheme corresponding to the low-code-rate encoding scheme, so that the second device can decode the received first encoded bit sequence as accurately as possible, thereby reducing a bit error rate. For a case of short-distance transmission, the transmit end may obtain the first encoded bit sequence by using a high-code-rate encoding scheme, and the second device may also decode the received first encoded bit sequence by using a decoding scheme corresponding to the high-code-rate encoding scheme. Using the high-code-rate encoding scheme and the corresponding decoding scheme improves an effective rate of data transmission and reduces overheads of network resources.

In an optional manner, the first encoding scheme includes at least one of a quantity of repetitions of the information bit sequence, a precoding scheme, and a line coding scheme.

In an optional manner, N is a positive integer greater than or equal to 2, the first sequence further includes a third sequence, and the third sequence is used to partition the first encoded bit sequence; and/or the first sequence further includes a fourth sequence, and the fourth sequence is used to determine an end location of a first time unit in which the first sequence is located.

It should be noted that a time unit may be understood as a subframe, a slot, or the like, and different time units may have different lengths. This is not limited. The third sequence is introduced in the embodiments, so that the second device can correct a deviation of a data sampling point, thereby avoiding a problem that a demodulation bit error rate is high due to accumulation of synchronization errors. After the fourth sequence is introduced, an end location of the first sequence is accurately indicated in a case of a poor channel condition, thereby improving decoding performance of the second device and reducing missed detection and false detection.

In an optional manner, the first device may determine a quantity of third sequences. The quantity of the third sequences is related to a quantity N of bits in the first encoded bit sequence and at least one of a clock frequency accuracy Δf and a demodulation-allowed error ratio e of the second device that receives the second sequence and the first sequence. The second device may determine a time location of a 1$^{st}$ bit after the second sequence based on the third sequence; and receive the first encoded bit sequence of the first sequence at the time location of the 1$^{st}$ bit.

It should be noted that the first device obtains an encoded bit sequence after encoding the information bit sequence by using the encoding scheme corresponding to the first mask, and the first device may know a quantity of bits in the encoded bit sequence. The first device cannot accurately know the clock frequency accuracy Δf of the second device, but a unified specification can be set, and the first device may determine a value of Δf according to the specification. Further, a value of the demodulation-allowed error ratio e ranges from 0% to 100%. The quantity of the third sequences determined in this manner is more reliable.

In an optional manner, the quantity of the third sequences is K, and K satisfies the following manners:

$$K = \left\lceil \frac{N}{\left\lfloor \frac{e}{\Delta f} \right\rfloor} \right\rceil - 1, \text{ or} \qquad \text{Manner 1}$$

$$K = \left\lceil \frac{N \cdot \Delta f}{e} \right\rceil - 1 \qquad \text{Manner 2}$$

Δf is the clock frequency accuracy of the second device, e is the demodulation-allowed error ratio of the second device, ⌈ ⌉ represents rounding up, and ⌊ ⌋ represents rounding down.

In an optional manner, the first sequence is included in the first time unit, and the first device may determine a time location of the third sequence in the first time unit.

In an optional manner, the time location is determined, so that a quantity of bits in a first encoded bit sequence between the second sequence and the 1$^{st}$ third sequence is a first quantity of bits, and a quantity of bits in a first encoded bit sequence between a last third sequence and the fourth sequence that is in the first sequence and that is used to determine the end location of the first time unit is a second quantity of bits. If the 1$^{st}$ third sequence and the last third sequence are a same third sequence, the first quantity of bits is greater than or equal to the second quantity of bits; or if the 1$^{st}$ third sequence and the last third sequence are not a same third sequence, a quantity of bits in a first encoded bit sequence between every two third sequences between the 1$^{st}$ third sequence and the last third sequence is equal to the first quantity of bits. Alternatively, if the 1$^{st}$ third sequence and the last third sequence are a same third sequence, the first quantity of bits is less than or equal to the second quantity of bits; or if the 1$^{st}$ third sequence and the last third sequence are not a same third sequence, a quantity of bits in a first encoded bit sequence between every two third sequences between the 1$^{st}$ third sequence and the last third sequence is equal to the first quantity of bits.

In an optional manner, the first device may determine the time location of the third sequence in the first time unit based on the quantity N of bits in the first encoded bit sequence and at least one of the clock frequency accuracy Δf and the demodulation-allowed error ratio e of the second device.

In an optional manner, the first device may determine the first quantity of bits between the second sequence and the 1$^{st}$ third sequence based on the quantity N of bits in the first encoded bit sequence and at least one of the clock frequency accuracy Δf and the demodulation-allowed error ratio e of the second device. If the 1$^{st}$ third sequence and the last third sequence are a same third sequence, the first quantity of bits is greater than or equal to the second quantity of bits, and the second quantity of bits is the quantity of bits between the last third sequence and the fourth sequence that is in the first sequence and that is used to determine the end location of the first time unit; or if the 1$^{st}$ third sequence and the last third sequence are not a same third sequence, a quantity of bits between every two third sequences between the 1$^{st}$ third sequence and the last third sequence is equal to the first quantity of bits.

The first device determines the time location of the third sequence in the first time unit based on the quantity of the third sequences and the first quantity of bits.

Alternatively, the first device determines the first quantity of bits between the second sequence and the 1$^{st}$ third sequence based on the quantity N of bits in the first encoded bit sequence and at least one of the clock frequency accuracy Δf and the demodulation-allowed error ratio e of the second device. If the 1$^{st}$ third sequence and the last third sequence are a same third sequence, the first quantity of bits is less than or equal to the second quantity of bits, and the second quantity of bits is the quantity of bits between the last third sequence and the fourth sequence that is in the first sequence and that is used to determine the end location of the first time unit; or if the 1$^{st}$ third sequence and the last third sequence are not a same third sequence, a quantity of bits between every two third sequences between the 1$^{st}$ third sequence and the last third sequence is equal to the first quantity of bits. The first device determines the time location of the third sequence in the first time unit based on the quantity of the third sequences and the first quantity of bits.

In an optional manner, a quantity of bits in a first encoded bit sequence between the second sequence and the $1^{st}$ third sequence, between two adjacent third sequences, or between the last third sequence and the fourth sequence is M, and M satisfies the following manners:

$$M = \left\lfloor \frac{e}{\Delta f} \right\rfloor - \lambda, \text{ or} \quad \text{Manner 1}$$

$$M = \left\lfloor \frac{N}{\left\lceil \frac{N \cdot \Delta f}{e} \right\rceil} \right\rfloor - \lambda \quad \text{Manner 2}$$

Δf is the clock frequency accuracy of the second device, e is the demodulation-allowed error ratio of the second device, ⌈ ⌉ represents rounding up, ⌊ ⌋ represents rounding down, a value of λ is a nonnegative integer, and M is a positive integer.

In an optional manner, the first device may further send a fifth sequence and a second encoded bit sequence. The fifth sequence and the second encoded bit sequence are included in a second time unit, and the fifth sequence is used to determine a start location of the second time unit. A length of the fifth sequence is X/Y of a length of one orthogonal frequency division multiplexing (OFDM) symbol, and both X and Y are positive integers. Correspondingly, the second device may receive the fifth sequence and the second encoded bit sequence from the first device. The fifth sequence and the second encoded bit sequence are included in the second time unit, and the fifth sequence is used to determine a start location of the second encoded bit sequence. The length of the fifth sequence is X/Y of a length of one orthogonal frequency division multiplexing OFDM symbol, and both X and Y are positive integers. The second device determines the start location of the second encoded bit sequence based on the fifth sequence and decodes the second encoded bit sequence.

In the embodiments, when a coverage level of the second device is low, the second device may receive the fifth sequence and the second encoded bit sequence, thereby improving network transmission efficiency.

In an optional manner, a time domain resource occupied by each bit in the second encoded bit sequence is P/Q of the length of one OFDM symbol, where both P and Q are positive integers. Lengths of time domain resources occupied by bits in encoded bit sequences corresponding to different coverage levels are different. For example, a first coverage level corresponds to an encoded bit sequence I, a second coverage level corresponds to another encoded bit sequence U, and a length of a time domain resource occupied by each bit in the encoded bit sequence I is different from a length of a time domain resource occupied by each bit in the encoded bit sequence U. In this manner, an encoded bit sequence may adapt to a physical layer parameter of another OFDM-based communication system, for example, the length of the OFDM symbol.

In an optional manner, the length of the OFDM symbol is a length of an OFDM symbol in a cellular communication system. In this manner, a physical layer parameter of the cellular communication system may be compatible, and an OFDM transmission link of an existing cellular system may be reused to generate the fifth sequence and the second encoded bit sequence.

According to a second aspect, the embodiments provide a data transmission method. A first device may determine a fifth sequence and a second encoded bit sequence, and the first device sends the fifth sequence and the second encoded bit sequence. The fifth sequence and the second encoded bit sequence are included in a second time unit, and the fifth sequence is used to determine a start location of the second time unit. A length of the fifth sequence is X/Y of a length of one orthogonal frequency division multiplexing OFDM symbol, and both X and Y are positive integers. Correspondingly, a second device may receive the fifth sequence and the second encoded bit sequence from the first device, determine a start location of the second encoded bit sequence based on the fifth sequence, and decode the second encoded bit sequence.

In the embodiments, when a coverage level of the second device is low, the second device may receive the fifth sequence and the second encoded bit sequence, thereby improving network transmission efficiency.

In an optional manner, a time domain resource occupied by each bit in the second encoded bit sequence is P/Q of the length of one OFDM symbol, where both P and Q are positive integers. Lengths of time domain resources occupied by bits in encoded bit sequences corresponding to different coverage levels are different. In this manner, an encoded bit sequence may adapt to a physical layer parameter of another OFDM-based communication system, for example, the length of the OFDM symbol.

In an optional manner, the length of the OFDM symbol is a length of an OFDM symbol in a cellular communication system. In this manner, a physical layer parameter of the cellular communication system may be compatible, and an OFDM transmission link of an existing cellular system may be reused to generate the fifth sequence and the second encoded bit sequence.

According to a third aspect, the embodiments provide a data transmission method. A first device determines a first time unit. The first time unit is used to send a first sequence and a second sequence. The first sequence includes a first encoded bit sequence obtained by encoding an information bit sequence based on a first encoding scheme, the first encoded bit sequence includes N bits, and N is a positive integer. The second sequence is used to determine a start location of a 1 first encoded bit sequence, the second sequence corresponds to the first encoding scheme, and second sequences with different data rates correspond to different encoding schemes. The first device sends the second sequence and the first sequence in the first time unit. Correspondingly, a second device receives the second sequence and the first sequence from the first device. The second device determines the first encoding scheme based on the second sequence. The second device processes the received first encoded bit sequence by using a decoding scheme corresponding to the first encoding scheme.

In the embodiments, in a case of a low data rate, a power spectral density and a signal-to-noise ratio of a wanted signal can be improved, so that long-distance transmission of data between the first device and the second device can be ensured.

In addition, in the embodiments, second sequences with different data rates correspond to different coverage levels.

In an optional manner, the first encoding scheme includes at least one of a code rate and a quantity of repetitions of the information bit sequence, and a data rate of the first encoded bit sequence.

In the embodiments, a poor channel condition such as long-distance transmission corresponds to a high coverage level. In this case, the high coverage level corresponds to a low code rate, a large quantity of repetitions, and a low data rate. In this manner, reliable data transmission can be ensured. A good channel condition such as short-distance transmission corresponds to a low coverage level. In this case, the low coverage level corresponds to a high code rate, a small quantity of repetitions, and a high data rate. In this manner, overheads of a network device can be reduced.

According to a fourth aspect, the embodiments provide a data transmission method. A first device determines a first time unit. The first time unit is used to send control information, a first sequence, and a second sequence. The control information corresponds to a first encoding scheme. The first sequence includes a first encoded bit sequence obtained by encoding an information bit sequence based on the first encoding scheme, the first encoded bit sequence includes N bits, and N is a positive integer. The second sequence is used to determine a start location of a $1^{st}$ first encoded bit sequence. At least one of a code rate and a quantity of bits in the control information, and a data rate of a control sequence corresponding to the control information is indicated by using the second sequence. The first device sends the second sequence, the control information, and the first sequence in the first time unit. Correspondingly, a second device receives the control information, the second sequence, and the first sequence from the first device. The second device determines the first encoding scheme based on the control information. The second device processes the received first encoded bit sequence by using a decoding scheme corresponding to the first encoding scheme.

In the embodiments, the first time unit includes the control information, and more information bit sequence parameter combinations may be indicated by lower resource overheads in a more flexible and efficient manner.

In an optional manner, the first encoding scheme includes at least one of a code rate and a quantity of repetitions of the information bit sequence, and a data rate of the first encoded bit sequence.

In the third aspect and the fourth aspect, the first sequence may include a fourth sequence. In addition, when N is a positive integer greater than or equal to 2, the first sequence may further include a third sequence. A quantity or locations or the like of third sequences and/or fourth sequences may be determined based on the method provided in the first aspect. In actual application, the first device may also send a fifth sequence and the like. For details, refer to the descriptions of the first aspect. Details are not described herein.

According to a fifth aspect, an embodiment provides a communication apparatus. The communication apparatus may be a first device (for example, the first device in the first aspect, the first device in the second aspect, the first device in the third aspect, or the first device in the fourth aspect) or a chip disposed inside a first device, or may be a second device (for example, the second device in the first aspect, the second device in the second aspect, the second device in the third aspect, or the second device in the fourth aspect) or a chip disposed inside a second device. The communication apparatus has a function of implementing any one of the first aspect to the fourth aspect. For example, the communication apparatus includes a corresponding module, unit, manner, or means for performing steps in any one of the first aspect to the fourth aspect. The function, unit, manner, or means may be implemented by using software, or may be implemented by using hardware, or may be implemented by hardware executing corresponding software.

In a possible implementation, the communication apparatus includes a processing unit and a transceiver unit. The transceiver unit may be configured to send and receive a signal, to implement communication between the communication apparatus and another apparatus. For example, the transceiver unit is configured to receive configuration information from the second device. The processing unit may be configured to perform some internal operations of the communication apparatus. The transceiver unit may be referred to as an input/output unit, a communication unit, or the like. The transceiver unit may be a transceiver, and the processing unit may be a processor. When the communication apparatus is a module (for example, a chip) in a communication device, the transceiver unit may be an input/output interface, an input/output circuit, an input/output pin, or the like, and may alternatively be referred to as an interface, a communication interface, an interface circuit, or the like; and the processing unit may be a processor, a processing circuit, a logic circuit, or the like.

In another possible implementation, the communication apparatus includes a processor, and may further include a transceiver. The transceiver is configured to send and receive a signal, and the processor executes program instructions, to complete the method in any one of the possible embodiments or implementations of the first aspect to the fourth aspect. The communication apparatus may further include one or more memories. The memory is configured to be coupled to the processor, and the memory may store a necessary computer program or instructions for implementing the function in any one of the first aspect to the fourth aspect. The processor may execute the computer program or the instructions stored in the memory. When the computer program or the instructions are executed, the communication apparatus is enabled to implement the method in any one of the possible embodiments or implementations of the first aspect to the fourth aspect.

In another possible implementation, the communication apparatus includes a processor, and the processor may be configured to be coupled to a memory. The memory may store a necessary computer program or instructions for implementing the function in any one of the first aspect to the fourth aspect. The processor may execute the computer program or the instructions stored in the memory. When the computer program or the instructions are executed, the communication apparatus is enabled to implement the method in any one of the possible embodiments or implementations of the first aspect to the fourth aspect.

In another possible implementation, the communication apparatus includes a processor and an interface circuit. The processor is configured to: communicate with another apparatus by using the interface circuit and perform the method in any one of the possible embodiments or implementations of the first aspect to the fourth aspect.

It may be understood that in the fifth aspect, the processor may be implemented by using hardware or may be implemented by using software. When the processor is implemented by using the hardware, the processor may be a logic circuit, an integrated circuit, or the like. When the processor is implemented by using the software, the processor may be a general-purpose processor, and is implemented by reading software code stored in the memory. In addition, there may be one or more processors and one or more memories. The memory may be integrated with the processor, or the memory and the processor are disposed separately. In a specific implementation process, the memory and the processor may be integrated into one chip or may be disposed on different chips. A type of the memory and a manner in which the memory and the processor are disposed are not limited in embodiments of this application.

According to a sixth aspect, an embodiment provides a communication system. The communication system includes the first device and the second device in the first aspect to the fourth aspect.

According to a seventh aspect, an embodiment provides a chip system. The chip system includes a processor, and may further include a memory, configured to implement the method in any one of the possible implementations or embodiments of the first aspect to the fourth aspect. The chip system may include a chip or may include the chip and another discrete device.

According to an eighth aspect, the embodiments further provide a non-transitory computer-readable storage medium. The non-transitory computer-readable storage medium stores computer-readable instructions. When the computer-readable instructions are run on a computer, the computer is enabled to perform the method in any one of the possible implementations or embodiments of the first aspect to the fourth aspect.

According to a ninth aspect, the embodiments provide a computer program product including instructions. When the computer program product is run on a computer, the computer is enabled to perform the method in embodiments of the first aspect to the fourth aspect.

For effects that can be achieved in the second aspect to the ninth aspect, refer to descriptions of effects that can be achieved in the corresponding possible implementation solutions in the first aspect. Details are not described herein again.

DETAILED DESCRIPTION OF EMBODIMENTS

To make the objectives, solutions, and advantages clearer, the following further describes the embodiments in detail with reference to the accompanying drawings. A specific operation method in a method embodiment may also be applied to an apparatus embodiment or a system embodiment. In the descriptions of the embodiments, unless otherwise specified, "a plurality of" means two or more. Therefore, for implementations of the apparatus and the method, reference may be made to each other, and repeated parts are not described again.

Figure 1:
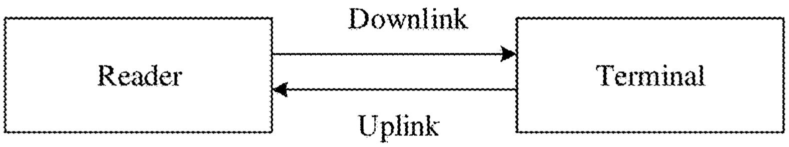
FIG. 1 is a diagram of an architecture of a UHF RFID system.
Figure 2:
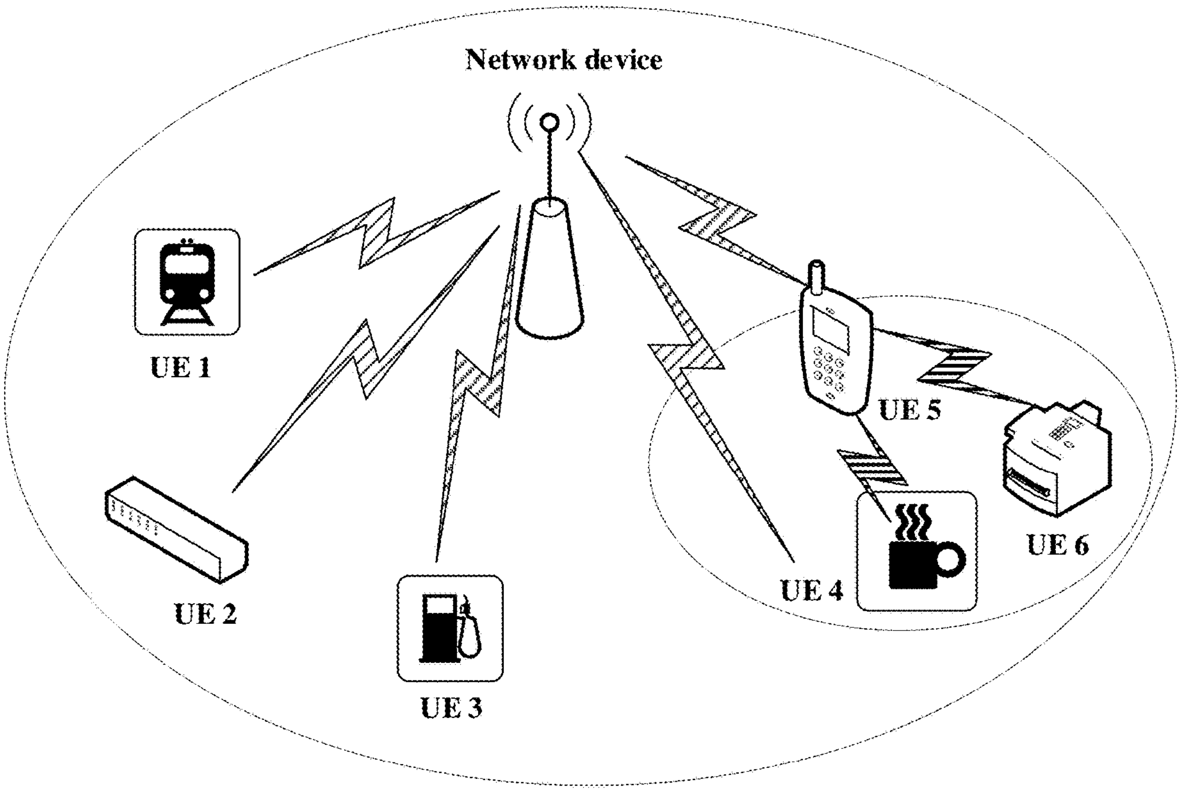
FIG. 2 is a diagram of a communication system according to an embodiment.
Figure 3A:
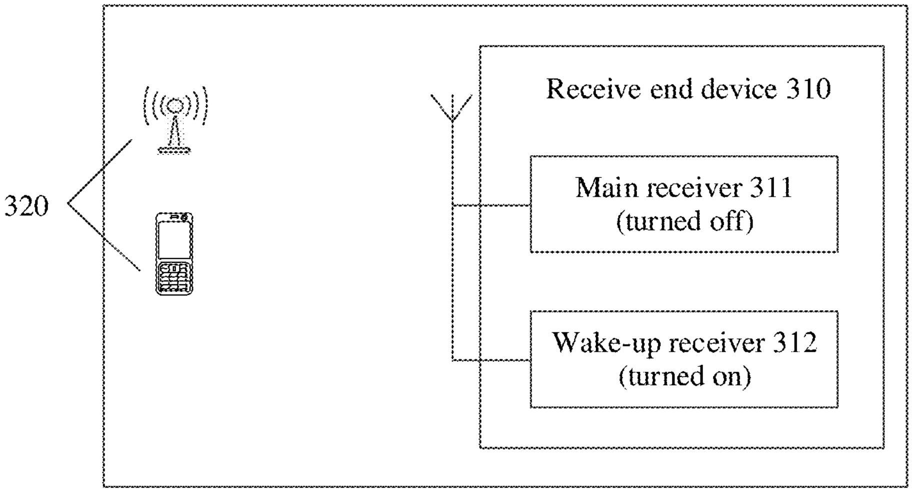
FIG. 3A is a diagram of a WUR application scenario.
Figure 3B:
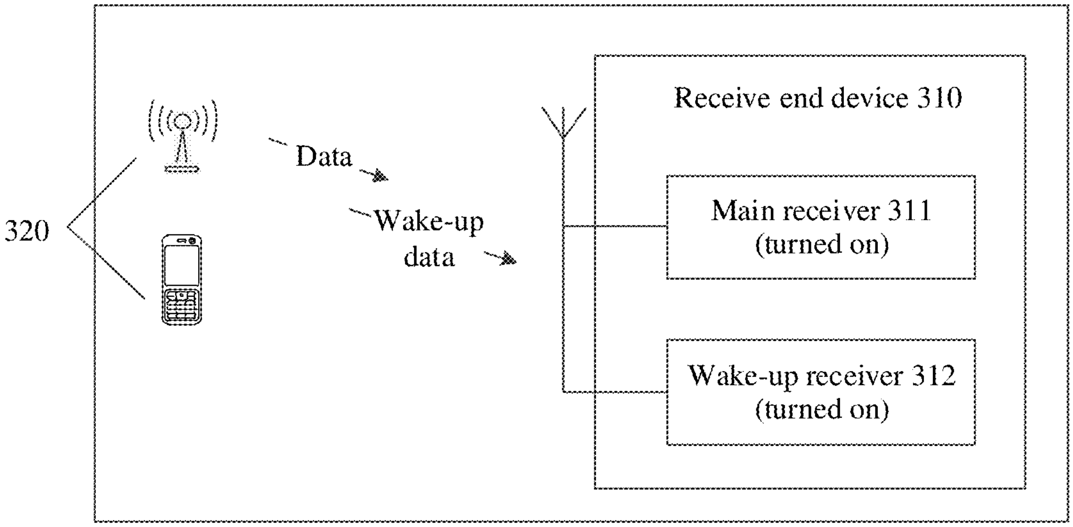
FIG. 3B is a diagram of a WUR application scenario.

The embodiments may be applied to a 5G new radio (NR) system. As shown in FIG. 2, a network device and user equipment (UE) 1 to UE 6 form a communication system. In the communication system, the UE 1 to the UE 6 may send information to the network device, and the network device may receive the information sent by the UE 1 to the UE 6, and feed back a response message. The embodiments may alternatively be applied to a backscatter communication system, as shown in FIG. 1, or may be applied to a WUR application scenario, as shown in FIG. 3A to FIG. 3B, or may be applied to another communication system, for example, a next-generation communication system. This is not limited.

In a WUR application scenario, after primary connection radio (PCR) with high power consumption, also referred to as a main receiver, enters a sleep state, a wake-up frame sent by an access point (AP) is monitored by using a companion radio with low power consumption, also referred to as a wake-up receiver, and the PCR is woken up after the wake-up frame is detected. As shown in FIG. 3A, a main receiver 311 and a wake-up receiver 312 are deployed in a receive end device 310. When a transmit end device 320 (for example, an AP or a terminal device) does not send data, the main receiver is turned off, which is also referred to as being in a sleep state, and the wake-up receiver is turned on. With reference to FIG. 3B, when sending data, the transmit end device 320 first sends wake-up data (for example, the wake-up frame). After receiving the wake-up data by using the wake-up receiver 312, the receive end device 310 activates the main receiver 311, so that the main receiver is turned on, which is also referred to as being in an active state. At this time, the receive end device 310 receives, by using the main receiver 311, the data sent by the transmit end device 320 after sending the wake-up data.

The network device is an apparatus deployed in a radio access network to provide a wireless communication function for a terminal device. The network device is a device having a wireless transceiver function or a chip that can be disposed in the device. The device includes but is not limited to: an evolved NodeB (CNB), a radio network controller (RNC), a NodeB (NB), a base station controller (BSC), a base transceiver station (BTS), a home base station (for example, a home evolved NodeB or a home NodeB, HNB), a baseband unit (BBU), an AP in a wireless fidelity (Wi-Fi) system, a wireless relay node, a wireless backhaul node, a TRP, a transmission point (TP), or the like. The network device may alternatively be a gNB or a transmission point (a TRP or a TP) in a 5G (for example, NR) system, or one antenna panel or a group of antenna panels (including a plurality of antenna panels) of a base station in the 5G system or may be a network node that forms a gNB or a transmission point, for example, a distributed unit (DU), a satellite, or an uncrewed aerial vehicle.

In some deployments, a gNB may include a central unit (CU) and a DU. The gNB may further include a radio frequency unit (RU). The CU implements some functions of the gNB, and the DU implements some functions of the gNB. For example, the CU implements functions of a radio resource control (RRC) layer and a packet data convergence protocol (PDCP) layer. The DU implements functions of a radio link control (RLC) layer, a media access control (MAC) layer, and a physical (PHY) layer. Information at the RRC layer is eventually converted into information at the PHY layer (that is, sent by using the PHY layer), or is converted from information at the PHY layer. Therefore, in this architecture, higher layer signaling, such as RRC layer signaling or PDCP layer signaling, may also be considered as being sent by the DU or sent by the DU and the RU. It may be understood that the access network device may be a CU node, a DU node, or a device including a CU node and a DU node. In addition, the CU may be classified as a network device in an access network RAN, or the CU may be classified as a network device in a core network CN. This is not limited herein.

A terminal device in embodiments is an entity on a user side configured to receive or transmit a signal, and is configured to send an uplink signal to a network device, or receive a downlink signal from the network device. The terminal device includes a device that provides a user with voice and/or data connectivity, for example, may include a handheld device with a wireless connection function, or a processing device connected to a wireless modem. The terminal device may communicate with a core network through a radio access network (RAN) and exchange a voice and/or data with the RAN. The terminal device may include UE, a vehicle wireless communication technology (V2X) terminal device, a wireless terminal device, a mobile terminal device, a device-to-device (D2D) terminal device, a machine-to-machine/machine-type communication (M2M/MTC) terminal device, an IoT terminal device, a subscriber unit, a subscriber station, a mobile station, a remote station, an AP, a remote terminal, an access terminal, a user terminal, a user agent, a user device, a wearable device, a vehicle-mounted device, an uncrewed aerial vehicle, or the like.

By way of example rather than limitation, the terminal device in embodiments may alternatively be a wearable device. The wearable device may also be referred to as a wearable intelligent device, an intelligent wearable device, or the like, and is a generic term for wearable devices that are intelligently designed and developed for daily wear by using a wearable technology, for example, glasses, gloves, watches, clothes, and shoes. The wearable device is a portable device that is worn on a body directly or integrated into clothes or an accessory of a user. The wearable device is not only a hardware device, but also implements a powerful function through software support, data exchange, and cloud-based interaction. In a broad sense, a wearable intelligent device includes a full-featured and large-sized device that can implement all or some of functions without relying on a smartphone, for example, a smart watch or smart glasses, and includes a device that focuses only on a specific type of application function and needs to be used together with another device such as a smartphone, for example, various types of smart bands, smart helmets, or smart jewelry for vital sign monitoring.

If the various terminal devices described above are located in a vehicle (for example, placed in the vehicle or installed in the vehicle), the terminal devices may be all considered as vehicle-mounted terminal devices. The vehicle-mounted terminal devices are also referred to as, for example, on-board units (OBUs).

In addition, the terminal may also be understood as a tag in an RFID system, and the tag is classified into two types: a passive tag and a semi-passive tag. The passive tag does not have its own power supply, and needs to rectify a downlink radio frequency signal, and uses a direct current voltage output through rectification as a power supply for use by analog and digital circuits. The semi-passive tag has its own power supply and does not depend on a rectification output of the downlink radio frequency signal for power supply. The tag is similar to a meal card, a metro card, or the like, and is not described.

Considering a downlink frame structure defined in the ISO/IEC 18000-6C standard, the terminal determines a start location of a frame only by using a simple delimiter. However, in long-distance transmission of data between a reader and the tag, a large amount of noise and interference may exist in a transmission link and missed detection and false detection may easily occur. As a result, a start location of a downlink frame may not be correctly demodulated, which cannot be applied to long-distance transmission.

The embodiments provide a data transmission method. The method may be applied to the communication systems shown in FIG. 1 to FIG. 3B. In actual application, the method may be performed by a first device, or may be performed by a second device, or may be implemented by interaction between the first device and the second device. The first device may be a network device, a TRP, a gNB, a reader, or the like. The second device may be a terminal device, a vehicle-mounted device, a tag, or the like. This is not limited. Description is provided by way of the interaction between the first device and the second device. The following is illustrated by using different embodiments.

Embodiment 1

Figure 4:
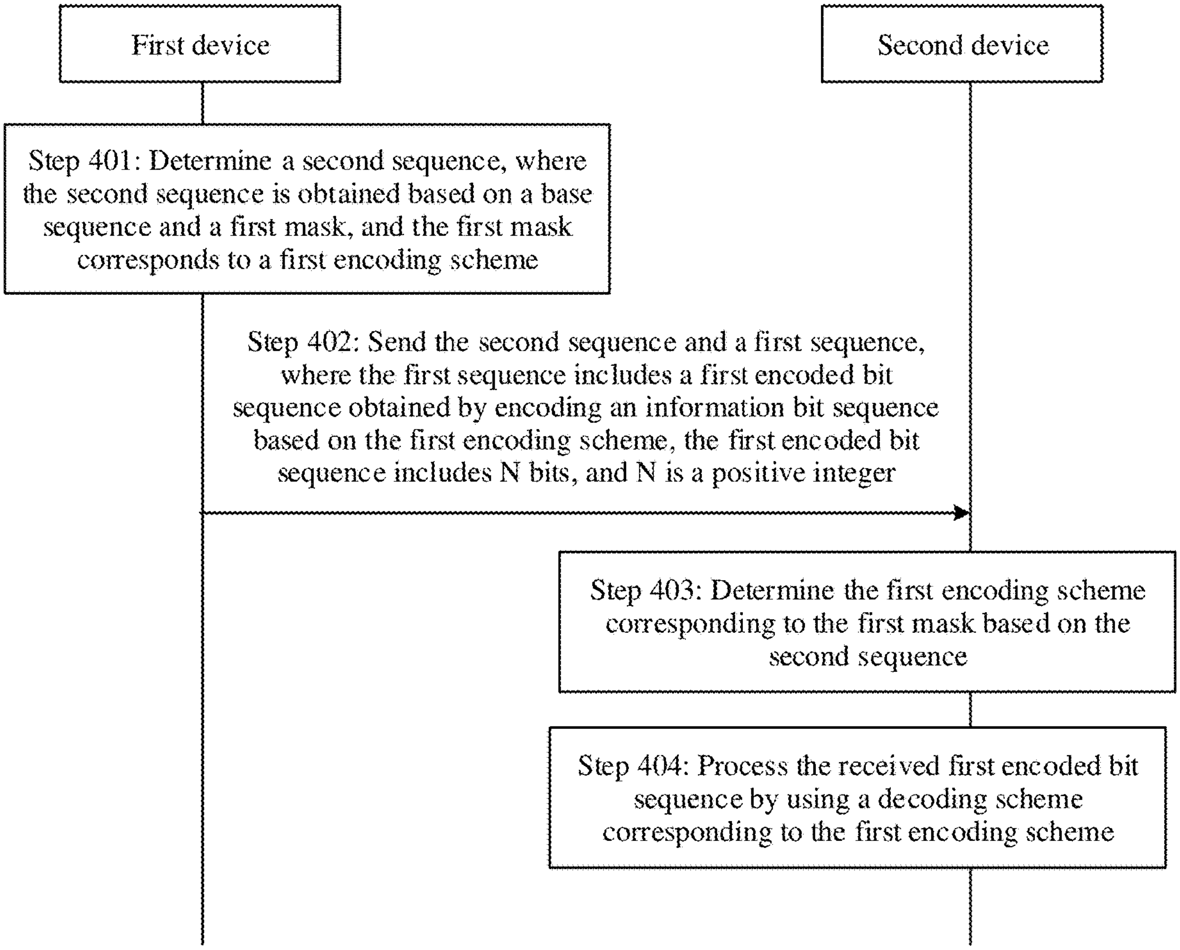
FIG. 4 is a schematic flowchart of a data transmission method according to an embodiment.

Refer to FIG. 4. The following may be performed.

Step 401: A first device determines a second sequence, where the second sequence is obtained based on a base sequence and a first mask, and the first mask corresponds to a first encoding scheme.

It should be noted that the base sequence may be −1 −1 1 1 −1 −1 −1 1 1 1 1 1 1 −1 1 −1 1 −1 1 1 −1 1 1 −1, or may be a sequence of another length. This is not limited, provided that an agreement is made between the first device and the second device. The first mask may be a cover code or may be a sequence code. This is not limited. In actual application, the second sequence may be determined based on weighted calculation of the base sequence and the first mask, for example, a Kronecker product of the base sequence and the first mask. This is not limited. The following is described by using an example in which the first mask is the cover code and the base sequence is the base sequence. The cover code C may be a sequence family of different lengths, for example, 1 bit, 2 bits, and 4 bits, as shown in Table 1. C(0) represents a $1^{st}$ bit of the cover code, C(1) represents a $2^{nd}$ bit of the cover code, C(2) represents a $3^{rd}$ bit of the cover code, and C(3) represents a $4^{th}$ bit of the cover code.

TABLE 1

| C(0) | C(1) | C(2) | C(3) |
|---|---|---|---|
| 1 | / | / | / |
| −1 | / | / | / |
| 1 | 1 | / | / |
| 1 | −1 | / | / |
| −1 | −1 | / | / |
| −1 | 1 | / | 1 |
| 1 | 1 | −1 | 1 |
| −1 | 1 | 1 | 1 |
| −1 | 1 | −1 | −1 |
| −1 | −1 | −1 | 1 |

A Kronecker product is defined as follows: If any m×n matrix X and any p×q matrix Y are given, and m, n, p, and q are all positive integers, a Kronecker product of the matrix X and the matrix Y is as follows:

$$X \otimes Y = \begin{pmatrix} x_{11}Y & x_{12}Y & \dots & x_{1n}Y \\ x_{21}Y & x_{22}Y & \dots & x_{2n}Y \\ \vdots & \vdots & \ddots & \vdots \\ x_{m1}Y & x_{m2}Y & \dots & x_{mn}Y \end{pmatrix}$$

A symbol ⊗ represents the Kronecker product, and X⊗Y is a mp×nq block matrix.

With reference to the foregoing Table 1 and a base sequence B, 10 different second sequences C⊗B are obtained through calculation by a Kronecker product, which are respectively: "B", "−B", "B B", "B −B", "−B −B", "−B B", "B B −B B", "−B B B B", "−B B −B −B", and "−B −B −B B". In practical application, determining the second sequence by the Kronecker product of the cover code and the base sequence can ensure that different cover codes correspond to different second sequences, so that the second sequence has more extensive applicability.

Step 402: The first device sends the second sequence and a first sequence, where the first sequence includes a first encoded bit sequence obtained by encoding an information bit sequence based on the first encoding scheme, the first encoded bit sequence includes N bits, and N is a positive integer; and correspondingly, the second device may receive the second sequence and the first sequence from the first device.

In addition, the first device and the second device may agree in advance that different first masks correspond to coverage levels of the second device that receives the second sequence and the first sequence. The coverage level may be alternatively replaced with a coverage condition, a type of the second device, a capability of the second device, signal power, signal quality, a quantity of repetitions, a data rate, or the like. This is not limited. Different coverage levels may correspond to different first encoding schemes, for example, a quantity of repetitions of the information bit sequence and a used encoding rule. In an optional embodiment, the first encoding scheme may include at least one of the following: a quantity of repetitions of the information bit sequence, a precoding scheme, and a line coding scheme. For example, the information bit sequence is "01", and is repeated four times to obtain the bit sequence "00001111". As shown in the following Table 2, when a precode is 1, it indicates that no precoding is performed, and when a precode is 0.5, it indicates that precoding is performed. A precoding rule may be as follows: An input bit "0" is encoded into "01", and an input bit "1" is encoded as into "10". This is merely an example for description and is not limited. Line coding may be pulse interval encoding (pulse interval encoding, PIE). An encoding rule is that an input bit "0" is encoded into "10", and an input bit "1" is encoded into "1110". Another encoding rule, such as Manchester encoding, may also be used, which is not limited. In Table 2, when the cover code is −1 1 −1 −1, the encoding scheme is that the information bit sequence is repeated 16 times, no precoding is performed, and line coding is performed by using the PIE to obtain an encoded bit sequence. In actual application, only one or more rows may be applied. This is not limited.

TABLE 2

| C(0) | C(1) | C(2) | C(3) | Quantity of repetitions of an information bit sequence | Precoding scheme | Line coding scheme |
|---|---|---|---|---|---|---|
| 1 | / | / | / | 1 | 1 | PIE |
| −1 | / | / | / | 1 | 0.5 | PIE |
| 1 | 1 | / | / | 1 | 1 | PIE |
| 1 | −1 | / | / | 1 | 0.5 | PIE |
| −1 | −1 | / | / | 4 | 0.5 | PIE |
| −1 | 1 | / | / | 16 | 0.5 | PIE |
| 1 | 1 | −1 | 1 | 1 | 0.5 | PIE |
| −1 | 1 | 1 | 1 | 4 | 0.5 | PIE |
| −1 | 1 | −1 | −1 | 16 | 0.5 | PIE |
| −1 | −1 | −1 | 1 | 64 | 0.5 | PIE |

Figure 5:
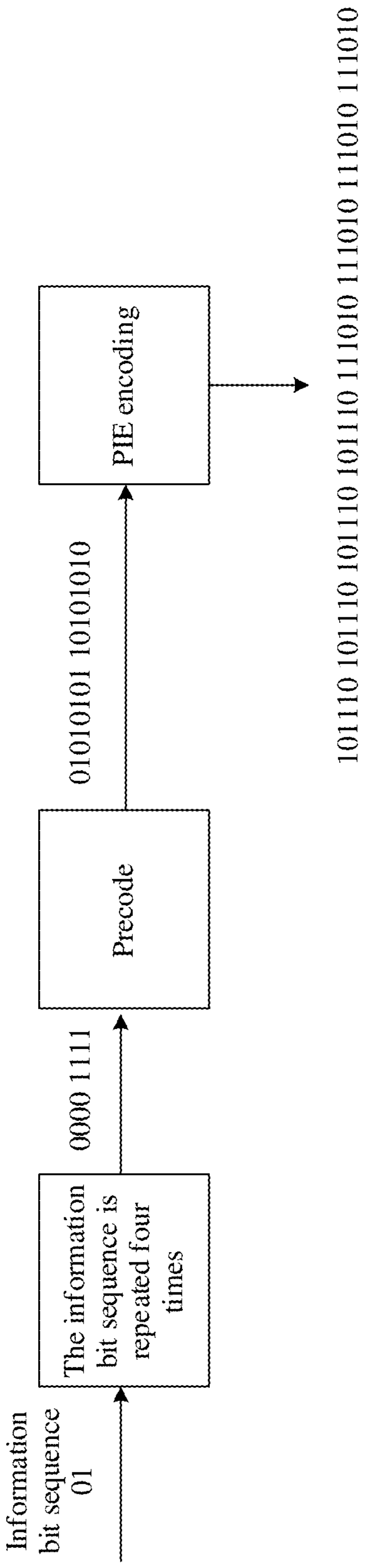
FIG. 5 is a diagram of encoding an information bit sequence according to an embodiment.

Refer to FIG. 5. To use a cover code "−1 −1", an information bit sequence 01 is repeated four times to obtain "00001111". Then, a bit sequence "01010101 10101010" is obtained after precoding (an input bit "0" is encoded into "01", and an input bit "1" is encoded into "10"). Next, PIE encoding is performed (an input bit "0" is encoded into "10", and an input bit "1" is encoded into "1110"), and an obtained encoded bit sequence is "101110 101110 101110 101110 111010 111010 111010 111010".

The first mask in the embodiments corresponds to the coverage level of the second device. A poor channel condition such as long-distance transmission corresponds to a high coverage level. In this case, the first mask corresponds to a low-code-rate encoding scheme. A good channel condition such as short-distance transmission corresponds to a low coverage level. In this case, the first mask corresponds to a high-code-rate encoding scheme. In the embodiments, the first encoded bit sequence is obtained based on the first encoding scheme corresponding to the first mask. In this way, for long-distance transmission, a transmit end may obtain the first encoded bit sequence by using a low-code-rate encoding scheme, and the second device may also decode the received first encoded bit sequence by using a decoding scheme corresponding to the low-code-rate encoding scheme, so that the second device can decode the received first encoded bit sequence as accurately as possible, thereby reducing a bit error rate. For a case of short-distance transmission, the transmit end may obtain the first encoded bit sequence by using a high-code-rate encoding scheme, and the second device may also decode the received first encoded bit sequence by using a decoding scheme corresponding to the high-code-rate encoding scheme. Using the high-code-rate encoding scheme and the corresponding decoding scheme improves an effective rate of data transmission and reduces overheads of network resources.

Step 403: The second device determines the first encoding scheme corresponding to the first mask based on the second sequence.

Step 404: The second device processes the received first encoded bit sequence by using a decoding scheme corresponding to the first encoding scheme.

In the embodiments, the second device may process the received first encoded bit sequence based on a decoding scheme corresponding to an encoding scheme corresponding to the first mask, to obtain to-be-received information. In addition, the second sequence is determined by using the base sequence and the first mask. Both the first device and the second device know the base sequence. When determining the second sequence, the second device may first perform correlation based on the base sequence, and then perform correlation based on the first mask. In other words, the second device may perform hierarchical correlation, so that correlation complexity of the second device can be reduced.

In addition, in the embodiments, the second device determines a start location of the first encoded bit sequence by using the received second sequence. For example, when detecting the second sequence, the second device may use a time unit corresponding to an end of the second sequence as the start location of the first encoded bit sequence, so that the second device can accurately determine the location of the first encoded bit sequence, preventing the second device from missed detection and false detection of the first encoded bit sequence as much as possible.

In addition, it should be further noted that the first sequence and the second sequence may be transmitted in a same time unit, and the time unit may be a subframe, a slot, or the like. This is not limited. In addition, the time unit may further correspond to a frame structure, a subframe structure, or the like. The frame structure or the subframe structure may include sequences such as the first sequence and the second sequence. This is not limited. It is assumed that the first sequence and the second sequence are transmitted in the first time unit. The following uses the first frame corresponding to the first time unit as an example for description. It should be further noted that, in an asynchronous system, lengths of frames may be different. This is not limited.

Figure 6:
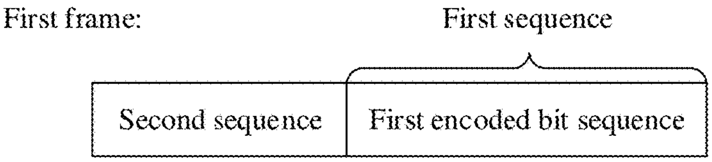
FIG. 6 is a diagram of a structure of a first frame according to an embodiment.

FIG. 6 shows a first frame according to an embodiment. The first frame includes a second sequence constructed by using a cover code and a preset sequence, and a first encoded bit sequence encoded by an encoding scheme related to a coverage level. Alternatively, the second device may determine a start location of a frame based on the second sequence in the first frame (the second sequence is similar to a preamble, and the preamble may indicate the start location of the frame), and decode the first encoded bit sequence based on a decoding mode corresponding to a coverage level corresponding to the cover code. In this manner, a case of missed detection and false detection can be prevented.

Considering that interference from an external transmission environment may be caused in a data transmission process, a third sequence may be introduced into the first frame to calibrate a data sampling point, thereby avoiding a data synchronization error and reducing a bit error rate. If N is a positive integer greater than or equal to 2, that is, the first encoded bit sequence is a plurality of bits, the first sequence may further include the third sequence, and the third sequence is used to partition the first encoded bit sequence. A quantity of third sequences may be related to a quantity N of bits in the first encoded bit sequence and at least one of a clock frequency accuracy Δf and a demodulation-allowed error ratio e of the second device that receives the second sequence and the first sequence. The second device may determine a time location of a $1^{st}$ bit after the second sequence based on the third sequence; and receive the first encoded bit sequence of the first sequence at the time location of the $1^{st}$ bit.

It should be noted that the first device obtains an encoded bit sequence after encoding the information bit sequence by using an encoding scheme corresponding to the cover code, and the first device may know a quantity of bits in the encoded bit sequence. However, the first device cannot accurately know the clock frequency accuracy Δf of the second device. In some embodiments, a unified specification may be set, and the first device may determine a value of Δf according to the specification. Additionally, a value of the demodulation-allowed error ratio e ranges from 0% to 100% and may be selected depending on a specific requirement in actual application. The quantity of the third sequences determined in this manner is more reliable.

In an optional embodiment, the quantity of the third sequences is K, and K satisfies the following formulas:

$$K = \left\lceil \frac{N}{\left\lfloor \frac{e}{\Delta f} \right\rfloor} \right\rceil - 1, \text{ or} \qquad \text{Formula 1}$$

$$K = \left\lceil \frac{N \cdot \Delta f}{e} \right\rceil - 1 \qquad \text{Formula 2}$$

Δf is the clock frequency accuracy of the second device, e is the demodulation-allowed error ratio of the second device, $\lceil\ \rceil$ represents rounding up, and $\lfloor\ \rfloor$ represents rounding down.

The two symbols in the following are not described again.

Figure 7:
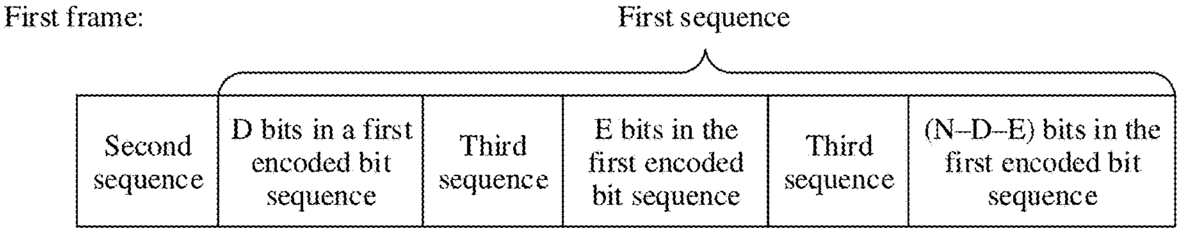
FIG. 7 is a diagram of a structure of another first frame according to an embodiment.

For example, when N=1024, Δf=100 ppm, and e=0.04, when Formula 1 is used, K is 2, and when Formula 2 is used, K is also 2. In actual application, the third sequence is introduced into the first sequence, and a time location of the third sequence in the first time unit needs to be further determined. For example, the third sequence may be randomly inserted into the first encoded bit sequence. For example, a quantity of first encoded bit sequences is 10. After calculation, it is determined that two third sequences are required. A $1^{st}$ third sequence may be inserted at a time location of a $4^{th}$ sequence, and a $2^{nd}$ third sequence may be inserted at a time location of an $8^{th}$ sequence. Alternatively, the $1^{st}$ third sequence may be inserted at a location of a $3^{rd}$ sequence, and the $2^{nd}$ third sequence may be inserted at a location of a $6^{th}$ sequence. This is not limited. For example, the first encoded bit sequence includes 1024 bits. After calculation, it is determined that three third sequences are required. A $1^{st}$ third sequence may be inserted at a time location of a $100^{th}$ bit, a $2^{nd}$ third sequence may be inserted at a time location of a $300^{th}$ bit, and a $3^{rd}$ third sequence may be inserted at a time location of an $800^{th}$ bit. Alternatively, the $1^{st}$ third sequence may be inserted at a location of the $300^{th}$ bit, the $2^{nd}$ third sequence may be inserted at a location of a $600^{th}$ bit, and the $3^{rd}$ third sequence may be inserted at a location of a $900^{th}$ bit. This is not limited. The first frame may be shown in FIG. 7. The first frame includes the second sequence, the third sequence, and the first encoded bit sequence (including N bits). A $1^{st}$ third sequence is inserted with a gap of D bits following the second sequence, and a $2^{nd}$ third sequence is inserted with a gap of E bits following the $1^{st}$ third sequence. Both the D bits and the E bits herein belong to the first encoded bit sequence. Herein, only two third sequences are used as an example for description.

In an optional embodiment, the third sequence may be the same as the second sequence. In the embodiments, the third sequence is the same as the second sequence, so that the second device reuses a same processing circuit, thereby reducing complexity, power consumption, and costs of the second device.

To improve demodulation performance of the second device, the first sequence may further include a fourth sequence. The fourth sequence is used to determine an end location of a first time unit in which the first sequence is located. The fourth sequence may include the second sequence that is repeated a plurality of times. For example, when the second sequence is "B", "−B", "B B", "B −B", "−B −B", "−B B", "B B −B B", "−B B B B", "−B B −B −B", and "−B −B −B B", the fourth sequence is "B B", "−B −B", "B B B B", "B −B B −B", "−B −B −B −B", "−B B −B B", "B −B B B B −B B", "−B B B B −B B B B", "−B B −B −B −B B −B −B", and "−B −B −B B −B −B −B B". The fourth sequence is a second sequence that is repeated a plurality of times, so that when demodulating an encoded bit sequence, the second device determines a location at which the encoded bit sequence in the first frame ends.

It should be noted that, in the embodiments, the time location is determined, so that a quantity of bits in a first encoded bit sequence between the second sequence and the $1^{st}$ third sequence is a first quantity of bits, and a quantity of bits in a first encoded bit sequence between a last third sequence and the fourth sequence that is in the first sequence and that is used to determine the end location of the first time unit is a second quantity of bits. If the $1^{st}$ third sequence and the last third sequence are a same third sequence (that is, the quantity of the third sequences is 1), the first quantity of bits may be greater than or equal to the second quantity of bits; or if the $1^{st}$ third sequence and the last third sequence are not a same third sequence (that is, the quantity of the third sequences is not 1), a quantity of bits in a first encoded bit sequence between every two third sequences between the $1^{st}$ third sequence and the last third sequence may be equal to the first quantity of bits. Alternatively, if the $1^{st}$ third sequence and the last third sequence are a same third sequence, the first quantity of bits may be less than or equal to the second quantity of bits; or if the $1^{st}$ third sequence and the last third sequence are not a same third sequence, a quantity of bits in a first encoded bit sequence between every two third sequences between the $1^{st}$ third sequence and the last third sequence may be equal to the first quantity of bits.

In actual application, the first frame may further include the second sequence, the third sequence, the first encoded bit sequence, and the fourth sequence. The first device may determine the time location of the third sequence in the first time unit based on the quantity N of bits in the first encoded bit sequence and at least one of the clock frequency accuracy Δf and the demodulation-allowed error ratio e of the second device. The first device may determine the first quantity of bits in the first encoded bit sequence between the second sequence and the $1^{st}$ third sequence based on the quantity N of bits in the first encoded bit sequence and at least one of the clock frequency accuracy Δf and the demodulation-allowed error ratio e of the second device. If the $1^{st}$ third sequence and the last third sequence are a same third sequence, the first quantity of bits is greater than or equal to the second quantity of bits, and the second quantity of bits is the quantity of bits in the first encoded bit sequence between the last third sequence and the fourth sequence that is in the first sequence and that is used to determine the end location of the first time unit; or if the $1^{st}$ third sequence and the last third sequence are not a same third sequence, a quantity of bits in the first encoded bit sequence between every two third sequences between the $1^{st}$ third sequence and the last third sequence is equal to the first quantity of bits. The first device determines the time location of the third sequence in the first time unit based on the quantity of the third sequences and the first quantity of bits (for example, if the first encoded bit sequence is 502 bits (bits), and the first frame includes one third sequence, the $1^{st}$ third sequence is the last third sequence, and a quantity of bits (252 bits) between the second sequence and the third sequence is greater than or equal to a quantity of bits (250 bits) between the third sequence and the fourth sequence; or if the first frame includes two third sequences, the $1^{st}$ third sequence is not the last third sequence, and a quantity of bits between the second sequence and the $1^{st}$ third sequence is the same as a quantity of bits (168 bits) between the $1^{st}$ third sequence and the $2^{nd}$ third sequence, and is greater than or equal to a quantity of bits (166 bits) between the $2^{nd}$ third sequence and the fourth sequence). An insertion location of each third sequence is determined based on the quantity of the third sequences and each quantity of bits.

Alternatively, the first device determines the first quantity of bits in the first encoded bit sequence between the second sequence and the $1^{st}$ third sequence based on the quantity N of bits in the first encoded bit sequence and at least one of the clock frequency accuracy Δf and the demodulation-allowed error ratio e of the second device. If the $1^{st}$ third sequence and the last third sequence are a same third sequence, the first quantity of bits is less than or equal to the second quantity of bits, and the second quantity of bits is the quantity of bits in the first encoded bit sequence between the last third sequence and the fourth sequence that is in the first sequence and that is used to determine the end location of the first time unit; or if the $1^{st}$ third sequence and the last third sequence are not a same third sequence, a quantity of bits in the first encoded bit sequence between every two third sequences between the $1^{st}$ third sequence and the last third sequence is equal to the first quantity of bits. The first device determines the time location of the third sequence in the first time unit based on the quantity of the third sequences and the first quantity of bits (for example, if the first encoded bit sequence is 502 bits, and the first frame includes one third sequence, the $1^{st}$ third sequence is the last third sequence, and a quantity of bits (250 bits) between the second sequence and the third sequence is less than or equal to a quantity of bits (252 bits) between the third sequence and the fourth sequence; or if the first frame includes two third sequences, the $1^{st}$ third sequence is not the last third sequence, and a quantity of bits between the second sequence and the $1^{st}$ third sequence is the same as a quantity of bits (166 bits) between the $1^{st}$ third sequence and the $2^{nd}$ third sequence, and is less than or equal to a quantity of bits (170 bits) between the $2^{nd}$ third sequence and the fourth sequence). An insertion location of each third sequence is determined based on the quantity of the third sequences and each quantity of bits.

A quantity of bits in a first encoded bit sequence between the second sequence and the $1^{st}$ third sequence, between two adjacent third sequences, or between the last third sequence and the fourth sequence is M, and M satisfies the following formulas:

$$M = \left\lfloor \frac{e}{\Delta f} \right\rfloor - \lambda, \text{ or} \qquad \text{Formula 3}$$

$$M = \left\lfloor \frac{N}{\left\lceil \frac{N \cdot \Delta f}{e} \right\rceil} \right\rfloor - \lambda \qquad \text{Formula 4}$$

$\Delta f$ is the clock frequency accuracy of the second device, e is the demodulation-allowed error ratio of the second device, a value of $\lambda$ is a nonnegative integer, and M is a positive integer.

It should be noted that the quantity of bits between the second sequence and the third sequence and the quantity of bits between the third sequence and the fourth sequence are both the quantity of bits in the first encoded bit sequence.

Figure 8A:
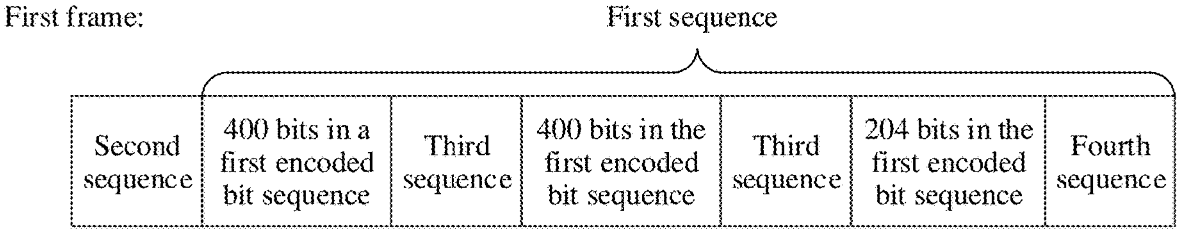
FIG. 8A is a diagram of a structure of another first frame according to an embodiment.
Figure 8B:
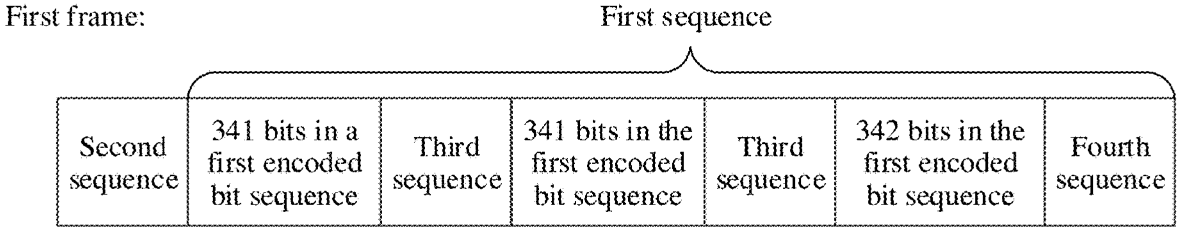
FIG. 8B is a diagram of a structure of still another first frame according to an embodiment.

Still in the foregoing example, when N=1024, $\Delta f$=100 ppm, e=0.04, and $\lambda$=0, when Formula 3 is used, M is 400. As shown in FIG. 8A, when K is 2, a first encoded bit sequence of 400 bits exists between a second sequence and a $1^{st}$ third sequence, a first encoded bit sequence of 400 bits exists between the $1^{st}$ third sequence and a $2^{nd}$ third sequence, and a first encoded bit sequence of 204 bits (1024-400-400) exists between the $2^{nd}$ third sequence and a fourth sequence. When Formula 4 is used, M is 341. As shown in FIG. 8B. When K is 2, an encoded bit sequence of 341 bits exists between a second sequence and a $1^{st}$ third sequence, a first encoded bit sequence of 341 bits exists between the $1^{st}$ third sequence and a $2^{nd}$ third sequence, and a first encoded bit sequence of 342 bits (1024-341-341) exists between the $2^{nd}$ third sequence and a fourth sequence.

In actual application, a frame structure of the first frame may further include the second sequence, the first encoded bit sequence, and the fourth sequence, for example, when the quantity of bits in the encoded bit sequence is relatively small (N is less than or equal to M).

In an optional embodiment, the first device may further send a fifth sequence and a second encoded bit sequence. The fifth sequence and the second encoded bit sequence are included in a second time unit, and the fifth sequence is used to determine a start location of the second time unit. A length of the fifth sequence is X/Y of a length of one OFDM symbol, and both X and Y are positive integers. Correspondingly, the second device may receive the fifth sequence and the second encoded bit sequence from the first device, determine a start location of the second encoded bit sequence based on the fifth sequence, and decode the second encoded bit sequence.

Figure 9:
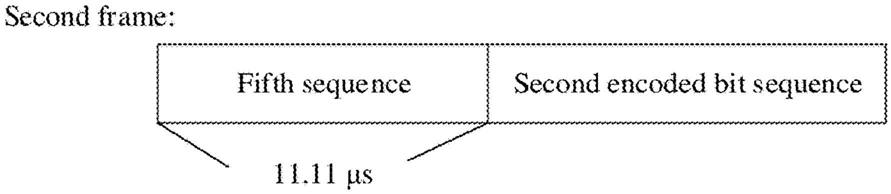
FIG. 9 is a diagram of a structure of a second frame according to an embodiment.

For example, X is 1, and Y is 6, or X is 6, and Y is 1. This is merely an example for description herein. As shown in FIG. 9, a second frame corresponding to the second time unit includes a fifth sequence with a length of 11.11 μs (⅙ of a length of an OFDM symbol in an LTE/NR system with a subcarrier spacing of 15 kHz) and a second encoded bit sequence.

It should be noted that a second frame structure may be different from the first frame structure. In actual application, the first device may transmit data of the first frame and the second frame in different time periods. If a capability of the first device is high, the first device may demodulate the first frame or the second frame to obtain the information bit sequence. When a coverage level of the first device is low, the first device may receive the fifth sequence and the second encoded bit sequence, thereby improving network transmission efficiency. In addition, the fifth sequence may also be generated by reusing an existing OFDM transmission link.

In addition, the length of the OFDM symbol may be a length of an OFDM symbol in a cellular communication system. In this manner, another OFDM-based communication system, for example, a cellular communication system, may be compatible.

In an optional embodiment, a time domain resource occupied by each bit in the second encoded bit sequence is P/Q of the length of one OFDM symbol, where both P and Q are positive integers. Lengths of time domain resources occupied by bits in encoded bit sequences corresponding to different coverage levels are different. In this manner, the encoded bit sequence can adapt to a requirement of a cellular communication system.

Figure 10:
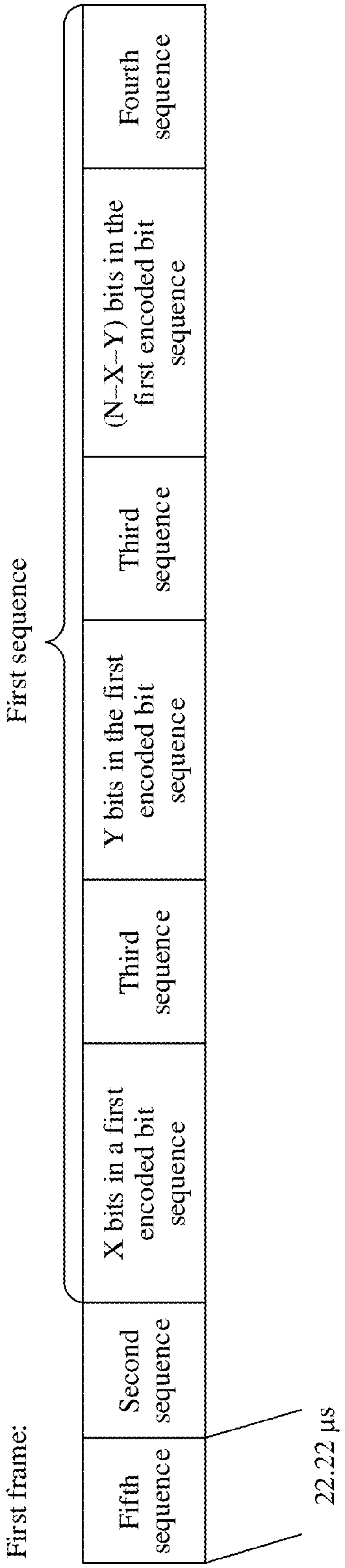
FIG. 10 is a diagram of a structure of still another first frame according to an embodiment.

In addition, in actual application, the first frame may alternatively include the fifth sequence, and a start location of the first frame is determined by using the fifth sequence and the second sequence together. As shown in FIG. 10, a length of the fifth sequence is 22.22 μs, and the first frame successively includes the fifth sequence, the second sequence, a partial first encoded bit sequence, the third sequence, a partial first encoded bit sequence, and the fourth sequence. When the start location of the first frame is determined, the fifth sequence can be introduced to improve stability of demodulating data by the second device.

In addition, when the second device is a tag, the first frame structure may be applied to a passive or semi-passive tag for demodulating data, and the second frame structure may be applied to a passive tag for demodulating data.

Embodiment 2

Figure 11:
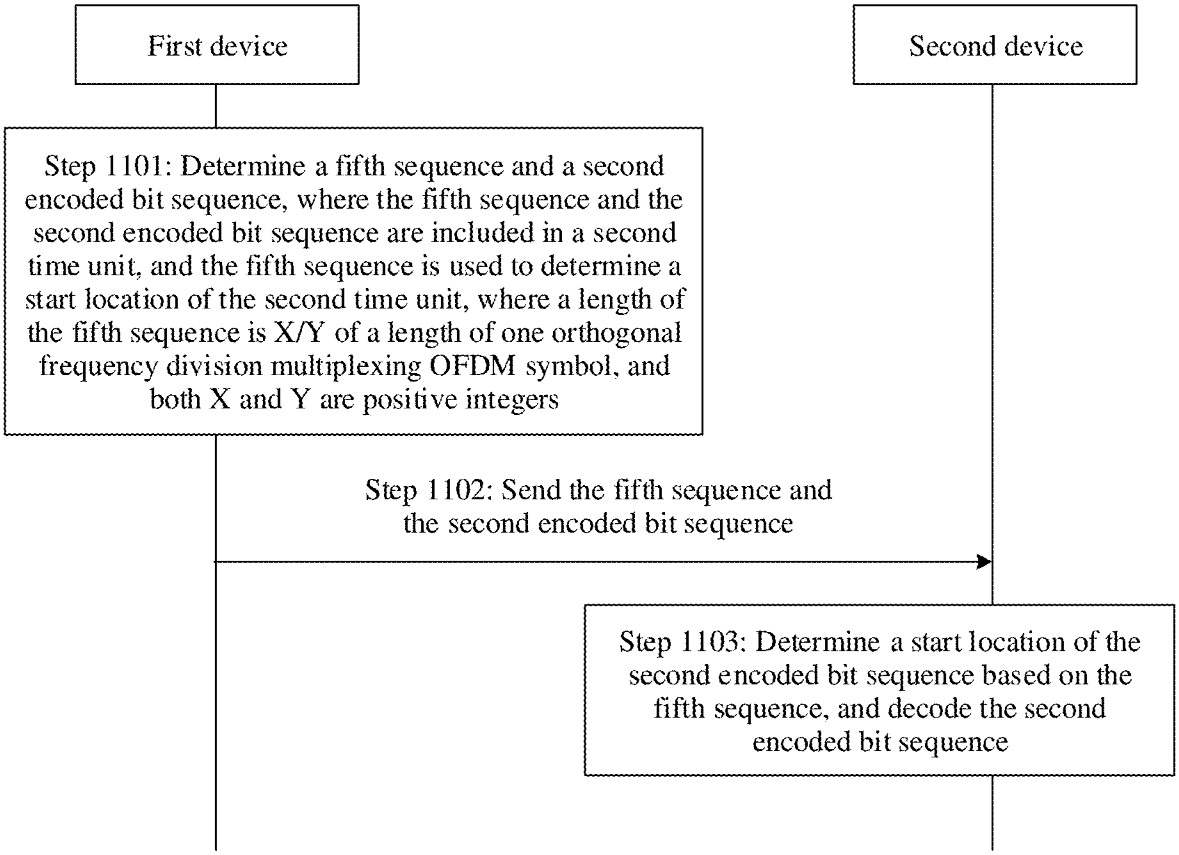
FIG. 11 is a schematic flowchart of another data transmission method according to an embodiment.

To adapt to a requirement of a passive tag in cellular communication, the embodiments further provide a data transmission method, as shown in FIG. 11. The following may be performed.

Step 1101: A first device determines a fifth sequence and a second encoded bit sequence, where the fifth sequence and the second encoded bit sequence are included in a second time unit, and the fifth sequence is used to determine a start location of the second time unit, where a length of the fifth sequence is X/Y of a length of one orthogonal frequency division multiplexing OFDM symbol, and both X and Y are positive integers.

Step 1102: The first device sends the fifth sequence and the second encoded bit sequence. Correspondingly, a second device may receive the fifth sequence and the second encoded bit sequence.

Step 1103: The second device determines a start location of the second encoded bit sequence based on the fifth sequence and decodes the second encoded bit sequence.

In the embodiments, when a coverage level of the second device is low, the second device may receive the fifth sequence and the second encoded bit sequence, thereby improving network transmission efficiency.

In an optional manner, the length of the OFDM symbol is a length of an OFDM symbol in a cellular communication system. In this manner, another OFDM-based communication system, for example, a cellular communication system, may be compatible.

In an optional manner, a time domain resource occupied by each bit in an encoded bit sequence is P/Q of the length of one OFDM symbol, where both P and Q are positive integers.

Lengths of time domain resources occupied by bits in encoded bit sequences corresponding to different coverage levels are different. In this manner, the encoded bit sequence can adapt to a requirement of a cellular communication system.

Embodiment 3

Figure 12:
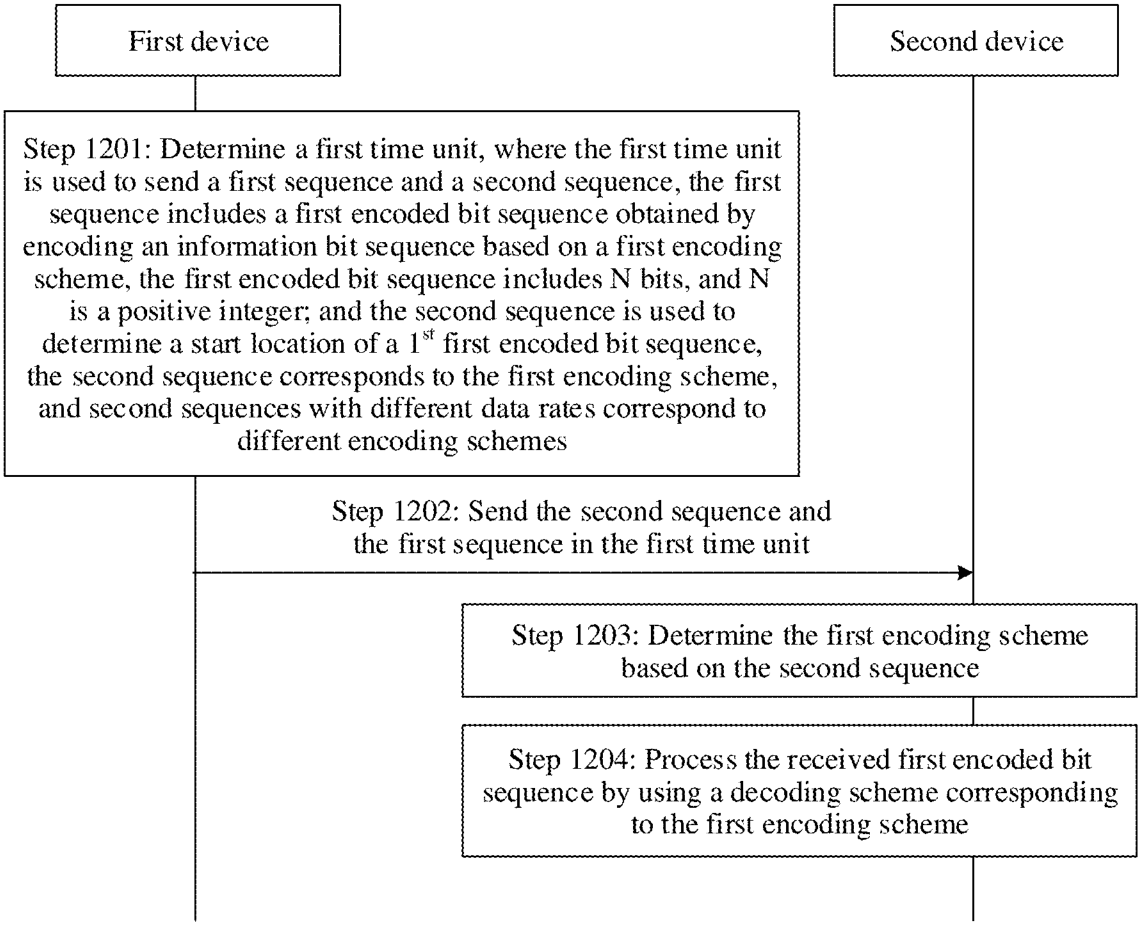
FIG. 12 is a schematic flowchart of still another data transmission method according to an embodiment.

To ensure long-distance transmission of data between a first device and a second device, the embodiments further provide a data transmission solution with reference to a data rate of a second sequence. As shown in FIG. 12, the following may be performed.

Step 1201: The first device determines a first time unit, where the first time unit is used to send a first sequence and a second sequence, the first sequence includes a first encoded bit sequence obtained by encoding an information bit sequence based on a first encoding scheme, the first encoded bit sequence includes N bits, and N is a positive integer; and the second sequence is used to determine a start location of a $1^{st}$ first encoded bit sequence, the second sequence corresponds to the first encoding scheme, and second sequences with different data rates correspond to different encoding schemes.

In an optional manner, the first encoding scheme includes at least one of a code rate and a quantity of repetitions of the information bit sequence, and a data rate of the first encoded bit sequence. In the embodiments, a poor channel condition such as long-distance transmission corresponds to a high coverage level. In this case, the high coverage level corresponds to a low code rate, a large quantity of repetitions, and a low data rate. In this manner, reliable data transmission can be ensured. A good channel condition such as short-distance transmission corresponds to a low coverage level. In this case, the low coverage level corresponds to a high code rate, a small quantity of repetitions, and a high data rate. In this manner, overheads of a network device can be reduced.

Figure 13:
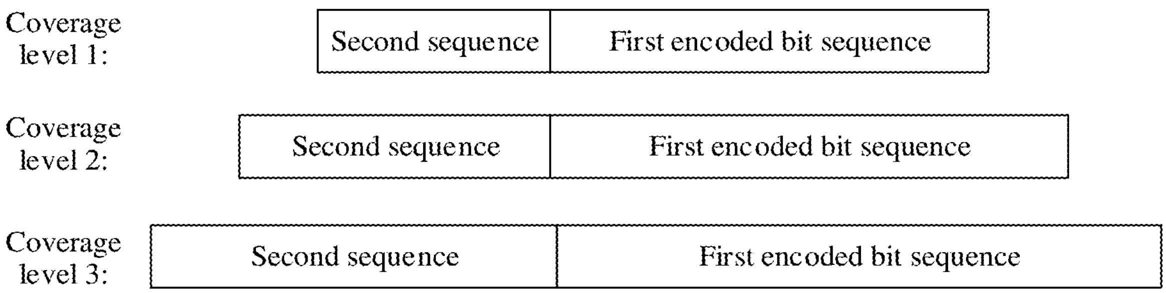
FIG. 13 is a diagram of a frame structure according to an embodiment.

It should be noted that when a first coverage level is lower than a second coverage level, a data rate, of a second sequence, corresponding to the first coverage level is greater than a data rate, of a second sequence, corresponding to the second coverage level. A length of the first encoded bit sequence refers to duration and is related to a data rate. However, a quantity of bits in the first encoded bit sequence is known (in data transmission, the quantity of bits in the first encoded bit sequence does not change at different coverage levels). As shown in FIG. 13, a coverage level 1 is less than a coverage level 2, and the coverage level 2 is less than a coverage level 3. In a frame corresponding to the coverage level 1, a data rate of a second sequence is greater than a data rate of a second sequence at the coverage level 2, and a data rate of a second sequence at the coverage level 3 is less than the data rate of the second sequence at the coverage level 2. Second sequences in different first sequences may be the same or may be different. For example, all second sequences in different first sequences are a bit sequence of 24 bits "−1 −1 1 1 −1 −1 −1 1 1 1 1 1 1 −1 1 −1 1 −1 1 1 −1 1 1 −1". In FIG. 13, different lengths indicate different data rates of the second sequence. A longer transmission time of a second sequence with a same quantity of bits indicates a smaller data rate. The data rate of the first encoded bit sequence is in a one-to-one correspondence with a length of a single bit in the encoded bit sequence. The data rate of the first encoded bit sequence is a reciprocal of the length of the single bit in the encoded bit sequence. A larger data rate of the first encoded bit sequence indicates a shorter length of the single bit in the encoded bit sequence. Correspondences between data rates of different first encoded bit sequences and code rates of a data part, lengths of a single bit in an encoded bit sequence, and quantities of repetitions are shown in Table 3 below. A data code rate corresponding to the coverage level 1 is ½, a length of a single bit in an encoded bit sequence is 11.11 μs (a corresponding data rate is 90 kbps (1 bit/11.11 μs)), and a quantity of repetitions of the information bit sequence is 1. In actual application, one or more rows in the table are applied. This is not limited.

TABLE 3

| Coverage level | Data code rate | Length of a single bit in an encoded bit sequence (μs) | Repetitions |
|---|---|---|---|
| 1 | 1/2 | 11.11 | 1 |
| 2 | 1/2 | 22.22 | 1 |
| 3 | 1/2 | 44.44 | 4 |
| 4 | 1/2 | 66.66 | 4 |

Step 1202: The first device sends the second sequence and the first sequence in the first time unit; and correspondingly, the second device receives the second sequence and the first sequence from the first device.

Step 1203: The second device determines the first encoding scheme based on the second sequence.

Step 1204: The second device processes the received first encoded bit sequence by using a decoding scheme corresponding to the first encoding scheme.

In the embodiments, in a case of the low data rate, a power spectral density and a signal-to-noise ratio of a wanted signal can be improved, so that long-distance transmission of the data between the first device and the second device can be ensured.

In an optional embodiment, the first time unit may be further used to send control information, the first sequence, and the second sequence. The control information corresponds to the first encoding scheme. The first sequence includes the first encoded bit sequence obtained by encoding the information bit sequence based on the first encoding scheme, the first encoded bit sequence includes the N bits, and N is a positive integer. The second sequence is used to determine the start location of the $1^{st}$ first encoded bit sequence. At least one of a code rate and a quantity of bits in the control information, and a data rate of a control sequence corresponding to the control information is indicated by using the second sequence. The first device sends the second sequence, the control information, and the first sequence in the first time unit. Correspondingly, the second device receives the control information and the second sequence from the first device. The second device determines the first encoding scheme based on the control information. The second device processes the received first encoded bit sequence by using the decoding scheme corresponding to the first encoding scheme.

Figure 14:
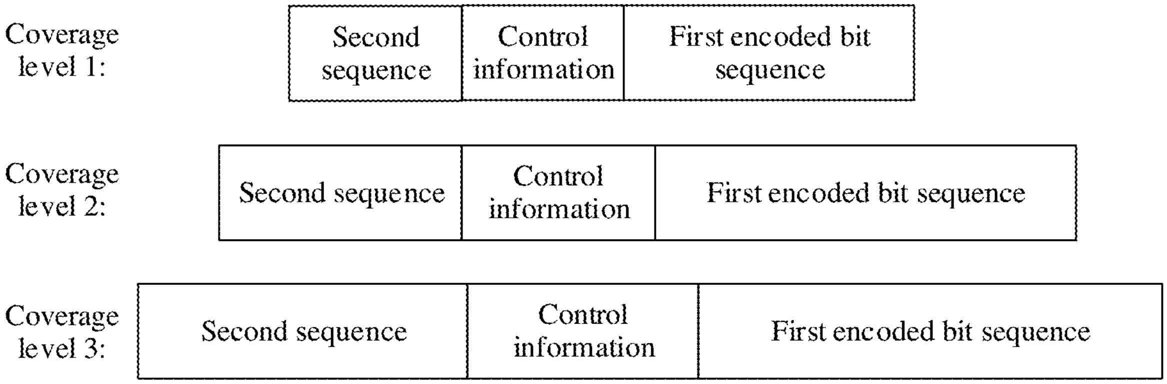
FIG. 14 is a diagram of another frame structure according to an embodiment.

Control information is shown in FIG. 14. At least one of a code rate of the control information, a quantity of bits in the control information, and a data rate of a control sequence corresponding to the control information is indicated by using a second sequence. The control information indicates at least one of a code rate of an information bit sequence, a quantity of repetitions of the information bit sequence, and a data rate of the information bit sequence. In FIG. 14, different lengths indicate different data rates of the control information. A longer transmission time of control information with a same quantity of bits indicates a smaller data rate. Correspondences between data rates of different second sequences and code rates of control information, lengths of a single bit in an encoded bit sequence, and quantities of bits in the control information are shown in Table 4 below. A control information code rate of a second sequence corresponding to a coverage level 1 is ½, a length of a single bit in an encoded bit sequence is 11.11 μs (a corresponding data rate is 90 kbps (1 bit/11.11 μs)), and a quantity of bits in control information is 2. In actual application, one or more rows in the table are applied. This is not limited.

TABLE 4

| Coverage level | Control information code rate | Length of a single bit in an encoded bit sequence (μs) | Quantity of bits in control information |
|---|---|---|---|
| 1 | 1/2 | 11.11 | 2 |
| 2 | 1/2 | 22.22 | 2 |
| 3 | 1/2 | 44.44 | 2 |
| 4 | 1/2 | 66.66 | 2 |

Correspondences between encoded bit sequences and control information may be shown in Table 5. A data code rate corresponding to a coverage level 1 is ½, and a length of a single bit in an encoded bit sequence is 11.11 μs (a corresponding data rate is 90 kbps (1 bit/11.11 μs)).

TABLE 5

| Coverage level | Control information of 2 bits | Data code rate | Length of a single bit in an encoded bit sequence (μs) | Repetitions |
|---|---|---|---|---|
| 1 | 00 | 1/2 | 11.11 | 1 |
| 2 | 01 | 1/2 | 22.22 | 1 |
| 3 | 10 | 1/2 | 44.44 | 4 |
| 4 | 11 | 1/2 | 66.66 | 4 |

Figure 15:
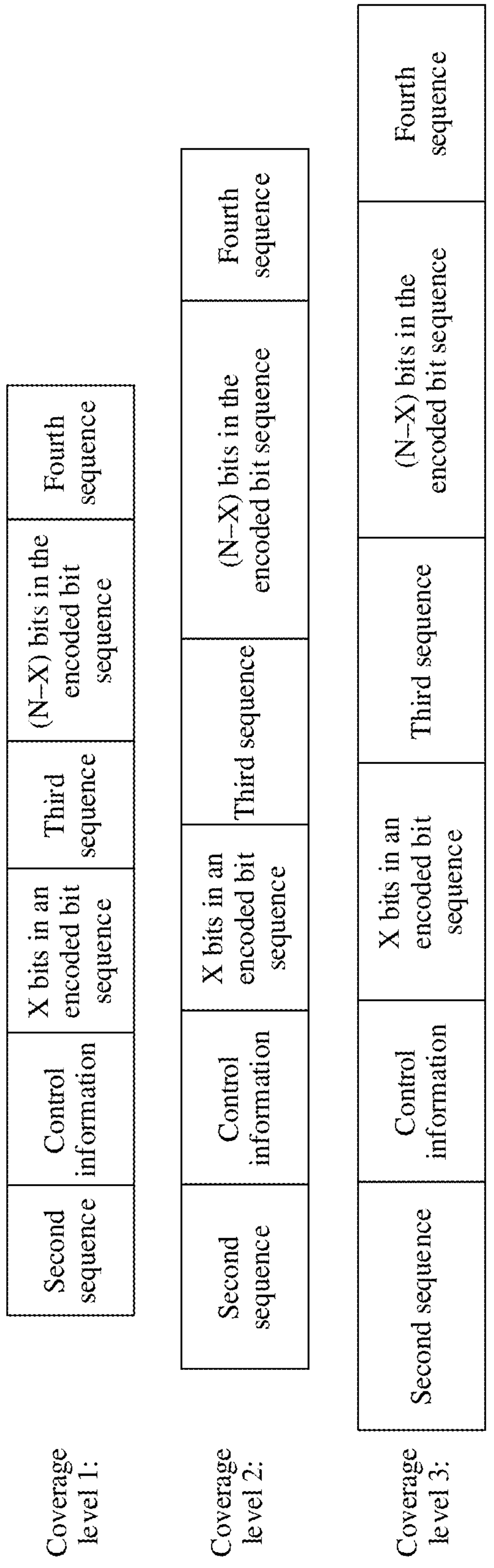
FIG. 15 is a diagram of still another frame structure according to an embodiment.

In addition, it should be further noted that the first time unit may further include a third sequence, a fourth sequence, and the like in Embodiment 1. The first time unit may be implemented with reference to the manner in Embodiment 1, and the second sequence may also be implemented with reference to the manner in Embodiment 1. For details, refer to the descriptions in Embodiment 1. Details are not described herein again. As shown in FIG. 15, a coverage level 1 is less than a coverage level 2, and the coverage level 2 is less than a coverage level 3. In a frame corresponding to the coverage level 1, a data rate of a second sequence is greater than a data rate of a second sequence at the coverage level 2, and a data rate of a second sequence at the coverage level 3 is less than the data rate of the second sequence at the coverage level 2. In FIG. 15, different lengths respectively indicate different data rates of a second sequence, control information, a third sequence, a fourth sequence, a first encoded bit sequence. For example, a longer transmission time of a second sequence with a same quantity of bits indicates a smaller data rate.

Figure 16:
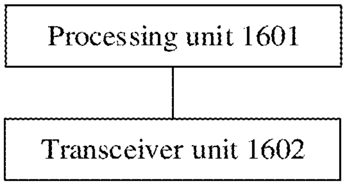
FIG. 16 is a diagram of a structure of a communication apparatus according to an embodiment.

Based on a same concept, the embodiments provide a communication apparatus, as shown in FIG. 16. The communication apparatus includes a processing unit 1601 and a transceiver unit 1602, and the communication apparatus may be the foregoing first device. It should be understood that the transceiver unit may be referred to as an input/output unit, a communication unit, or the like, the input/output unit may be a transceiver, and the processing unit may be a processor. When the communication apparatus is a module (for example, a chip) in the first device, the input/output unit may be an input/output interface, an input/output circuit, an input/output pin, or the like, and may alternatively be referred to as an interface, a communication interface, an interface circuit, or the like; and the processing unit may be a processor, a processing circuit, a logic circuit, or the like.

The communication apparatus may perform an operation corresponding to the first device in the foregoing method embodiments. For example, the processing unit 1601 in the first device is configured to determine a second sequence. The second sequence is obtained based on a base sequence and a first mask, and the first mask corresponds to a first encoding scheme. The transceiver unit 1602 is configured to send the second sequence and a first sequence. The first sequence includes a first encoded bit sequence obtained by coding an information bit sequence based on the first encoding scheme, the first encoded bit sequence includes N bits, and N is a positive integer.

Figure 19:
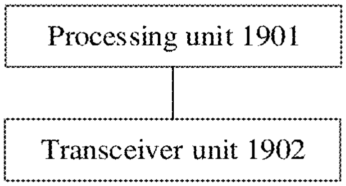
FIG. 19 is a diagram of a structure of a communication apparatus according to an embodiment.

The embodiments further provide a communication apparatus, as shown in FIG. 19. The communication apparatus includes a processing unit 1901 and a transceiver unit 1902, and the communication apparatus may be the foregoing second device. The communication apparatus is similar to the communication apparatus corresponding to the first device. The transceiver unit may be a transceiver, and the processing unit may be a processor. Alternatively, the communication apparatus may be a module (for example, a chip) in the second device.

When the communication apparatus is the second device, an operation corresponding to the second device in the foregoing method embodiments is performed. For example, the transceiver unit 1902 is configured to receive a second sequence and a first sequence from the first device. The second sequence is obtained based on a base sequence and a first mask, the first mask corresponds to a first encoding scheme, the first sequence includes a first encoded bit sequence obtained by encoding an information bit sequence based on the first encoding scheme, the first encoded bit sequence includes N bits, and N is a positive integer. The processing unit 1901 is configured to: determine the first encoding scheme corresponding to the first mask based on the second sequence; and process the first encoded bit sequence by using a decoding scheme corresponding to the first encoding scheme.

Figure 17:
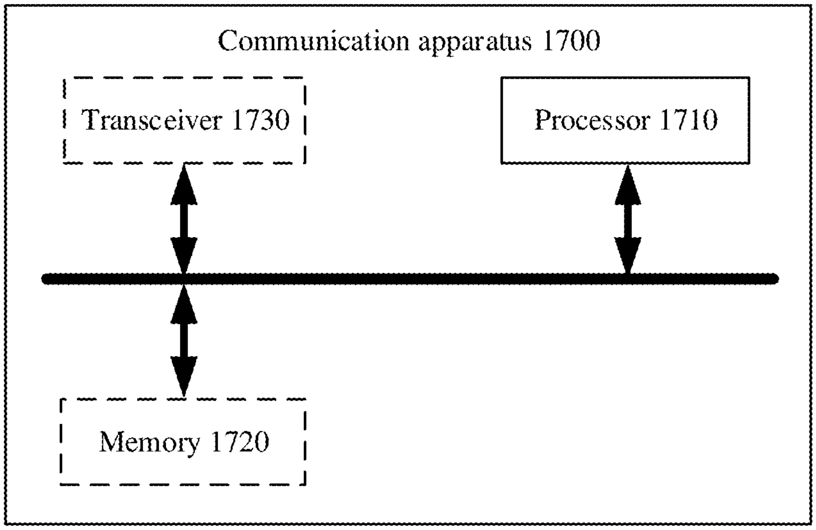
FIG. 17 is a diagram of a structure of a communication apparatus according to an embodiment.

In addition, for brevity, some descriptions in embodiments are not repeatedly described in other embodiments, but these descriptions are also applicable to the other embodiments. As shown in FIG. 17, the embodiments further provide a communication apparatus 1700. The communication apparatus 1700 may be a chip or a chip system. The communication apparatus may be located in a device in any one of the foregoing method embodiments, for example, an access network device or an SMF, to perform an action corresponding to the device.

Optionally, the chip system may include a chip, or may include a chip and another discrete device.

The communication apparatus 1700 includes a processor 1710.

The processor 1710 is configured to execute a computer program stored in a memory 1720, to implement an action of the device in any one of the foregoing method embodiments.

The communication apparatus 1700 may further include the memory 1720, configured to store the computer program.

Optionally, the memory 1720 is coupled to the processor 1710. The coupling is indirect coupling or a communication connection between apparatuses, units, or modules for information exchange between the apparatuses, the units, or the modules, and may be in electrical, mechanical, or other forms. Optionally, the memory 1720 is integrated with the processor 1710.

There may be one or more processors 1710 and one or more memories 1720. This is not limited.

Optionally, in actual application, the communication apparatus 1700 may include a transceiver 1730, or may not include the transceiver 1730, which is indicated by a dashed box in the figure. The communication apparatus 1700 may exchange information with another device by using the transceiver 1730. The transceiver 1730 may be a circuit, a bus, a transceiver, or any other apparatus that can be configured to exchange information.

In a possible implementation, the communication apparatus 1700 may be the first device or the second device in the foregoing method embodiments.

In this embodiment, a specific connection medium between the transceiver 1730, the processor 1710, and the memory 1720 is not limited. In this embodiment, the memory 1720, the processor 1710, and the transceiver 1730 are connected by using a bus in FIG. 17. The bus is represented by using a bold line in FIG. 17, and a connection manner between other components is merely an example for description and shall not be construed as a limitation. The bus may be classified into an address bus, a data bus, a control bus, and the like. For case of indication, the bus is indicated by using only one bold line in FIG. 17. However, this does not indicate that there is only one bus or only one type of bus. In embodiments, the processor may be a general-purpose processor, a digital signal processor, an application-specific integrated circuit, a field programmable gate array or another programmable logic device, a discrete gate or transistor logic device, or a discrete hardware component, and may implement or perform the methods, steps, and logical block diagrams provided in embodiments. The general-purpose processor may be a microprocessor or may be any conventional processor or the like. The steps of the method with reference to embodiments may be directly performed by a hardware processor or may be performed by using a combination of hardware in the processor and a software module.

In embodiments, the memory may be a non-volatile memory, for example, a hard disk drive (HDD) or a solid-state drive (SSD), or may be a volatile memory, such as a random access memory (RAM). The memory may alternatively be any other medium that can be configured to carry or store expected program code in a form of instructions or a data structure and that can be accessed by a computer. This is not limited thereto. The memory in this embodiment may alternatively be a circuit or any other apparatus that can implement a storage function, and is configured to store the computer program, the program instructions, and/or the data.

Figure 18:
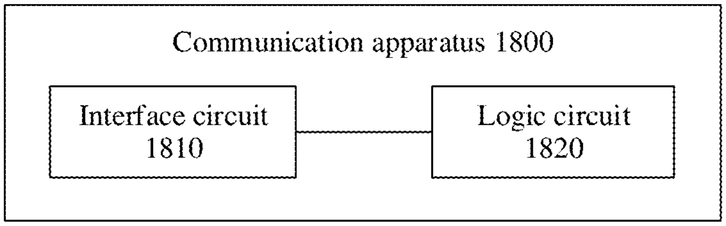
FIG. 18 is a diagram of a structure of a communication apparatus according to an embodiment.

Based on the foregoing embodiments, with reference to FIG. 18, an embodiment of further provides another communication apparatus 1800, including an interface circuit 1810 and a logic circuit 1820. The interface circuit 1810 may be understood as an input/output interface and may be configured to perform sending and receiving steps of each device in any one of the foregoing method embodiments, for example, the foregoing step 402, such as a sending step in which the first device sends the second sequence and the first sequence. The logic circuit 1820 may be configured to run code or instructions to perform the method performed by each device in any one of the foregoing embodiments. Details are not described again.

Based on the foregoing embodiments, an embodiment provides a communication system. The communication system includes the first device (for example, a gNB) and the second device (for example, UE) mentioned in any one of the foregoing method embodiments, and may be configured to perform the method performed by each device in any one of the foregoing method embodiments.

Based on the foregoing embodiments, an embodiment further provides a non-transitory computer readable storage medium. The non-transitory computer readable storage medium stores instructions. When the instructions are executed, the data transmission method in any one of the foregoing embodiments is implemented. The non-transitory computer readable storage medium may include any medium that can store program code, such as a USB flash drive, a removable hard disk, a read-only memory, a random access memory, a magnetic disk, or a compact disc.

A person skilled in the art should understand that embodiments may be provided as a method, a system, or a computer program product. Therefore, the embodiments may use a form of a hardware-only embodiment, a software-only embodiment, or an embodiment with a combination of software and hardware. In addition, the embodiments may use a form of a computer program product implemented on one or more computer-usable storage media (including, but not limited to, a disk memory, a CD-ROM, an optical memory, and the like) that include computer-usable program code.

is the embodiments are described with reference to the flowcharts and/or block diagrams of the method, the apparatus (system), and the computer program product according to the embodiments. It should be understood that each procedure and/or block in the flowcharts and/or block diagrams, and combinations of the procedures and/or blocks in the flowcharts and/or block diagrams may be implemented by computer program instructions. These computer program instructions may be provided to a general-purpose computer, a dedicated computer, an embedded processor, or a processor of another programmable data processing apparatus to generate a machine, so that the instructions executed by the computer or the processor of another programmable data processing apparatus generate an apparatus for implementing a function specified in one or more procedures in the flowcharts and/or in one or more blocks in the block diagrams.

These computer program instructions may be alternatively stored in a computer-readable memory that can instruct the computer or another programmable data processing apparatus to work in a specific manner, so that the instructions stored in the computer-readable memory generate an artifact that includes an instruction apparatus. The instruction apparatus implements a function specified in one or more procedures in the flowcharts and/or in one or more blocks in the block diagrams.

These computer program instructions may be alternatively loaded onto the computer or another programmable data processing apparatus, so that a series of operations and steps are performed on the computer or another programmable apparatus, thereby generating computer-implemented processing. Therefore, the instructions executed on the computer or another programmable apparatus provide steps for implementing a function specified in one or more procedures in the flowcharts and/or in one or more blocks in the block diagrams.

What is claimed is:

1. A method comprising:

determining, by a first device, a second sequence, wherein the second sequence is obtained based on a base sequence and a first mask that corresponds to a first encoding scheme; and sending, by the first device, the second sequence and a first sequence, wherein the first sequence comprises a first encoded bit sequence obtained by encoding an information bit sequence based on the first encoding scheme, the first encoded bit sequence comprises N bits, and N is a positive integer, wherein the first mask corresponds to a coverage level of a second device that receives the second sequence and the first sequence.

2. The method according to claim 1, wherein the first encoding scheme comprises at least one of the following:

a quantity of repetitions of the information bit sequence,
a precoding scheme, and
a line coding scheme.

3. The method according to claim 1, wherein

N is a positive integer greater than or equal to 2, the first sequence further comprises a third sequence, and the third sequence is used to partition the first encoded bit sequence; and/or the first sequence further comprises a fourth sequence used to determine an end location of a first time unit in which the first sequence is located.

4. The method according to claim 3, further comprising:

determining a quantity of third sequences, wherein the quantity of the third sequences is related to a quantity N of bits in the first encoded bit sequence and at least one of a clock frequency accuracy Δf and a demodulation-allowed error ratio e of the second device that receives the second sequence and the first sequence.

5. The method according to claim 3, wherein the quantity of the third sequences is K, and K satisfies the following manners:

$$K = \left\lceil \frac{N}{\left\lfloor \frac{e}{\Delta f} \right\rfloor} \right\rceil - 1, \text{ or} \qquad \text{Manner 1}$$

$$K = \left\lceil \frac{N \cdot \Delta f}{e} \right\rceil - 1, \qquad \text{Manner 2}$$

wherein Δf is a clock frequency accuracy of the second device that receives the second sequence and the first sequence, e is a demodulation-allowed error ratio of the second device, ⌈ ⌉ represents rounding up, and ⌊ ⌋ rounding down.

6. The method according to claim 3, wherein the first sequence is comprised in the first time unit, and the method further comprises:

determining a time location of the third sequence in the first time unit.

7. The method according to claim 6, wherein determining the time location of the third sequence in the first time unit further comprises:

determining the time location of the third sequence in the first time unit based on a quantity N of bits in the first encoded bit sequence and at least one of a clock frequency accuracy Δf and a demodulation-allowed error ratio e of the second device that receives the second sequence and the first sequence.

8. The method according to claim 7, wherein determining the time location of the third sequence in the first time unit based on the quantity N of bits in the first encoded bit sequence and at least one of the clock frequency accuracy Δf and the demodulation-allowed error ratio e of the second device that receives the second sequence and the first sequence further comprises:

determining a first quantity of bits between the second sequence and a 1st third sequence based on the quantity N of bits in the first encoded bit sequence and at least one of the clock frequency accuracy Δf and the demodulation-allowed error ratio e of the second device, wherein if the 1st third sequence and a last third sequence are a same third sequence, the first quantity of bits is greater than or equal to a second quantity of bits, and the second quantity of bits is a quantity of bits between the last third sequence and the fourth sequence that is in the first sequence and that is used to determine the end location of the first time unit; or after the 1st third sequence and the last third sequence are not a same third sequence, a quantity of bits between every two third sequences between the 1st third sequence and the last third sequence is equal to the first quantity of bits; and determining the time location of the third sequence in the first time unit based on the quantity of the third sequences and the first quantity of bits; or determining the time location of the third sequence in the first time unit based on the quantity N of bits in the first encoded bit sequence and at least one of the clock frequency accuracy Δf and the demodulation-allowed error ratio e of the second device that receives the second sequence and the first sequence further comprises:

determining a first quantity of bits between the second sequence and a 1st third sequence based on the quantity N of bits in the first encoded bit sequence and at least one of the clock frequency accuracy Δf and the demodulation-allowed error ratio e of the second device, wherein if the 1st third sequence and a last third sequence are a same third sequence, the first quantity of bits is less than or equal to a second quantity of bits, and the second quantity of bits is a quantity of bits between the last third sequence and the fourth sequence that is in the first sequence and that is used to determine the end location of the first time unit; or after the 1st third sequence and the last third sequence are not a same third sequence, a quantity of bits between every two third sequences between the 1st third sequence and the last third sequence is equal to the first quantity of bits; and determining the time location of the third sequence in the first time unit based on the quantity of the third sequences and the first quantity of bits.

9. The method according to claim 8, wherein a quantity of bits in a first encoded bit sequence between the second sequence and the 1st third sequence, between two adjacent third sequences, or between the last third sequence and the fourth sequence is M, and M satisfies the following manners:

$$M = \left\lfloor \frac{e}{\Delta f} \right\rfloor - \lambda, \text{ or} \qquad \text{Manner 1}$$

$$M = \left\lfloor \frac{N}{\left\lceil \frac{N \cdot \Delta f}{e} \right\rceil} \right\rfloor - \lambda, \qquad \text{Manner 2}$$

wherein Δf is the clock frequency accuracy of the second device that receives the second sequence and the first sequence, e is the demodulation-allowed error ratio of the second device, ⌈ ⌉ represents rounding up, and ⌊ ⌋ represents rounding down, a value of λ is a nonnegative integer, and M is a positive integer.

10. The method according to claim 3, further comprising:

sending, by the first device, a fifth sequence and a second encoded bit sequence, wherein the fifth sequence and the second encoded bit sequence are comprised in a second time unit, and the fifth sequence is used to determine a start location of the second time unit, a length of the fifth sequence is X/Y of a length of one orthogonal frequency division multiplexing (OFDM) symbol, and both X and Y are positive integers.

11. The method according to claim 10, wherein a time domain resource occupied by each bit in the second encoded bit sequence is P/Q of the length of one OFDM symbol, both P and Q are positive integers, and lengths of time domain resources occupied by bits in encoded bit sequences corresponding to different coverage levels are different.

12. The method according to claim 10, wherein the length of the OFDM symbol is a length of an OFDM symbol in a cellular communication system.

13. A device comprising:

one or more processors and one or more memories, wherein the one or more memories are coupled to the one or more processors, the one or more memories are configured to store computer program code, the computer program code comprises computer instructions, and when the one or more processors execute the computer instructions, the device is enabled to perform the method according to claim 1.

14. A non-transitory computer-readable storage medium comprising instructions that are executed by a computer to execute the method according to claim 1.

15. A method comprising:

receiving, by a second device, a second sequence and a first sequence from a first device, wherein the second sequence is obtained based on a base sequence and a first mask, the first mask corresponds to a first encoding scheme, the first sequence comprises a first encoded bit sequence obtained by encoding an information bit sequence based on the first encoding scheme, the first encoded bit sequence comprises N bits, and N is a positive integer;

determining, by the second device, the first encoding scheme corresponding to the first mask based on the second sequence; and processing, by the second device, the first encoded bit sequence by using a decoding scheme corresponding to the first encoding scheme, wherein the first mask corresponds to a coverage level of the second device that receives the second sequence and the first sequence.

16. The method according to claim 15, wherein the first encoding scheme comprises at least one of the following:

a quantity of repetitions of the information bit sequence, a precoding scheme, and a line coding scheme.

17. The method according to claim 15, wherein N is a positive integer greater than or equal to 2, the first sequence further comprises a third sequence used to partition the first encoded bit sequence and receiving, by the second device, the second sequence and the first sequence from the first device further comprises:

determining a time location of a $1^{st}$ bit after the second sequence based on the third sequence; and receiving the first encoded bit sequence of the first sequence at the time location of the $1^{st}$ bit.

18. The method according to claim 17, wherein the first sequence further comprises a fourth sequence used to determine an end location of a first time unit in which the first sequence is located.

* * * * *